(12) United States Patent
Xu et al.

(10) Patent No.: US 11,694,343 B2
(45) Date of Patent: Jul. 4, 2023

(54) BINOCULAR-VISION-BASED METHOD FOR TRACKING FRUIT SPACE ATTITUDE AND FRUIT SPACE MOTION

(71) Applicant: NANJING FORESTRY UNIVERSITY, Nanjing (CN)

(72) Inventors: Linyun Xu, Nanjing (CN); Hongping Zhou, Nanjing (CN); Guanhua Liu, Nanjing (CN); Jie Zhou, Nanjing (CN); Yan Xuan, Nanjing (CN); Xuesong Jiang, Nanjing (CN); Qing Chen, Nanjing (CN)

(73) Assignee: NANJING FORESTRY UNIVERSITY

( * ) Notice: Subject to any disclaimer, the term of this patent is extended or adjusted under 35 U.S.C. 154(b) by 163 days.

(21) Appl. No.: 17/296,624

(22) PCT Filed: Jan. 23, 2020

(86) PCT No.: PCT/CN2020/074017
§ 371 (c)(1),
(2) Date: May 25, 2021

(87) PCT Pub. No.: WO2020/108668
PCT Pub. Date: Jun. 4, 2020

(65) Prior Publication Data
US 2022/0005209 A1    Jan. 6, 2022

(30) Foreign Application Priority Data

Nov. 27, 2018 (CN) .......................... 201811438358.7

(51) Int. Cl.
*G06T 7/246* (2017.01)
*G06T 7/285* (2017.01)
(Continued)

(52) U.S. Cl.
CPC ................ *G06T 7/248* (2017.01); *G06T 3/60* (2013.01); *G06T 7/285* (2017.01); *G06T 7/66* (2017.01); *G06T 2207/30188* (2013.01)

(58) Field of Classification Search
CPC ........... G06T 7/248; G06T 3/60; G06T 7/285; G06T 7/66; G06T 2207/30188;
(Continued)

(56) References Cited

U.S. PATENT DOCUMENTS

2019/0340461 A1* 11/2019 Li ........................... G06T 7/194
2022/0005209 A1*  1/2022 Xu ........................... G06T 7/66

FOREIGN PATENT DOCUMENTS

| CN | 102981011 | 3/2013 |
| CN | 107063228 | 8/2017 |

(Continued)

OTHER PUBLICATIONS

X. Liu et al., "Robust Fruit Counting: Combining Deep Learning, Tracking, and Structure from Motion," 2018 IEEE/RSJ International Conference on Intelligent Robots and Systems (IROS), Madrid, Spain, 2018, pp. 1045-1052, doi: 10.1109/IROS.2018.8594239. (Year: 2018).*

(Continued)

*Primary Examiner* — Charles T Shedrick

(57) ABSTRACT

A binocular-vision-based method for tracking fruit space attitude and fruit space motion, the method comprising: establishing a connected base coordinate system by taking a junction of a fruit and a fruit stem as an origin; statically photographing a feature point on the surface of the fruit and a point of the connected base coordinate system established at the junction of the fruit and the fruit stem; storing a photographed image; acquiring an inherent relationship between the feature point and the connected base coordinate system; photographing dynamic motion of the fruit; acquir- (Continued)

ing absolute coordinates of the feature point on the surface of the fruit; calculating, according to the inherent relationship between the feature point and the connected base coordinate system, absolute coordinates of a point of the connected base coordinate system at each moment corresponding to each frame of image; and respectively calculating the displacement, instantaneous speed and instantaneous acceleration of the fruit, calculating swing angular displacement and swing angular acceleration of the fruit, and calculating a fruit torsion angular speed and a fruit torsion angular acceleration at the moment t. The study of a fruit motion state in the field of forest fruit harvest through vibration is performed, so that the motion of fruits can be better tracked.

7 Claims, 8 Drawing Sheets

(51) Int. Cl.
*G06T 7/66* (2017.01)
*G06T 3/60* (2006.01)

(58) Field of Classification Search
CPC .......... G06T 2207/10021; G06T 7/246; G06F 30/20; G06F 2119/06
See application file for complete search history.

(56) References Cited

FOREIGN PATENT DOCUMENTS

| CN | 108376411 | | 8/2018 | | |
|---|---|---|---|---|---|
| CN | 108458710 | | 8/2018 | | |
| CN | 109522669 | | 3/2019 | | |
| CN | 109522669 | A * | 3/2019 | ............ | G06F 30/20 |
| JP | 2009159787 | | 7/2009 | | |
| WO | WO-2020108668 | A1 * | 6/2020 | ............ | G06F 30/20 |

OTHER PUBLICATIONS

J. Moonrinta, S. Chaivivatrakul, M. N. Dailey and M. Ekpanyapong, "Fruit detection, tracking, and 3D reconstruction for crop mapping and yield estimation," 2010 11th International Conference on Control Automation Robotics & Vision, Singapore, 2010, pp. 1181-1186, doi: 10.1109/ICARCV.2010.5707436. (Year: 2010).*

* cited by examiner

BINOCULAR-VISION-BASED METHOD FOR TRACKING FRUIT SPACE ATTITUDE AND FRUIT SPACE MOTION

FIELD OF THE INVENTION

The present invention belongs to the field of fruit tree harvesting in agriculture and forestry, and specifically relates to a binocular-vision-based method for tracking fruit space attitude and fruit space motion, which is used in the study of fruit motion states in the field of fruit vibration harvesting.

BACKGROUND OF THE INVENTION

Fruit harvesting is the most time-consuming and laborious part of fruit production. For dried fruits such as red dates, walnuts, and ginkgo, the most effective harvesting method is mechanical vibration harvesting. The harvesting effect of its vibration harvesting machinery is related to many factors, including the growth characteristics of fruit trees and the working parameters of mechanical vibration. The research on the vibratory harvesting of forest fruits is more about viewing the tree itself as a second-order system, detecting the relationship between excitation and response, and measuring the overall stiffness and damping ratio of the tree. In recent years, more detailed research has been carried out in China and a simplified mechanical model of tree trunk and branch vibration has been established. Through experiments and theoretical calculations, it is believed that the cantilever straight beam model is more accurate, which provides a theoretical basis for the research of vibratory harvesting machinery. However, there are still gaps in the research on the movement of fruits during the vibration harvesting process, in order to explain the principle of vibratory fruit dropping in more detail, it is necessary to study the movement of fruits.

SUMMARY OF THE INVENTION

The technical problem to be solved by the present invention is to provide a binocular-vision-based method for tracking fruit space attitude and fruit space motion in response to the above-mentioned shortcomings of the prior art. This binocular-vision-based method for tracking fruit space attitude and fruit space motion method is aimed at the research of fruit movement state in the field of forest fruit vibration harvesting, which can better track the movement of fruit.

In order to achieve the above-mentioned technical objectives, the technical solutions adopted by the present invention are:

a binocular-vision-based method for tracking fruit space attitude and fruit space motion, comprising:

(1) marking three feature points $C_1$, $C_2$, $C_3$ on a surface of a fruit;

(2) establishing a connected base coordinate system by taking a junction of the fruit and a fruit stem as an origin, a X axis, a Y axis, and a Z axis of the connected base coordinate system are marked as a X connected-axis, a Y connected-axis and a Z connected-axis, respectively, and the origin of the connected base coordinate system is marked as $O_1$, an end point of the unit vector in a positive direction of the X connected-axis is marked as $X_1$, an end point of the unit vector in a positive direction of the Y connected-axis is marked as $Y_1$, an end point of the unit vector in a positive direction of the Z connected-axis is marked as $Z_1$;

(3) establishing a public reference base coordinate system;

(4) statically photographing the three feature points on the surface of the fruit and connected base coordinate system points $O_1$, $Y_1$, $X_1$, $Z_1$ established at the junction of the fruit and the fruit stem, using Phantom software to store the photographed images, and using TEMA software to process the feature points and connected base coordinate system points $O_1$, $X_1$, $Y_1$, $Z_1$ in the images, acquiring a absolute coordinate of the feature points $C_1$, $C_2$, $C_3$ and the connected base coordinate system points $O_1$, $Y_1$, $X_1$, $Z_1$, and then acquiring an inherit relationship between the feature points and the connected base coordinate system;

(5) photographing the fruit dynamic motion, using Phantom software to store each frame of the image in the photographed video, using TEMA software to process the feature points in the images to acquiring the absolute coordinate of the feature points on the fruit surface, according to an inherent relationship between the feature points and the connected base coordinate system, the absolute coordinate of each frame of image corresponding to the connected base coordinate system points $O_1$, $X_1$, $Y_1$, $Z_1$ at each moment being calculated by inverse rotation transformation, and calculating an angle between the vector $\overrightarrow{O_1Z_1}$ at each moment and the Z axis in the public reference base coordinate system through the space vector angle formula, and the angle representing a swing posture of the fruit;

(6) rotating the $\overrightarrow{O_1Z_1}$ at each moment to a position that coincides with the Z axis in the public reference base coordinate system, and calculating an angle between the rotated $\overrightarrow{O_1X_1}$ and the X axis in the public reference base coordinate system, the angle representing a twisting posture of the fruit; and (7) setting moments corresponding to two adjacent frames to t+1 moment and t moment, and calculating a displacement of the point $O_1$ along the X axis, Y axis and Z axis of the public reference base coordinate system at t+1 moment and t moment respectively, calculating an instantaneous speed along the X axis, an instantaneous speed along the Y axis, and an instantaneous speed along the Z axis of the fruit at t moment according to the displacement, calculating an instantaneous acceleration along the X axis, an instantaneous acceleration along the Y axis and an instantaneous acceleration along the Z axis of the fruit at t moment according to the instantaneous speed, calculating a swing angular displacement of the fruit in a time interval between the two adjacent frames of images, sequentially calculating a swing angular speed of the fruit at t moment and a swing angular acceleration of the fruit at t moment via the swing angular displacement, and calculating a torsion angular speed of the fruit at t moment and a torsion angular acceleration of the fruit at t moment according to the torsion angular degree from t moment to t+1 moment.

As a further improved technical solution for the present invention, the step (2) includes:

establishing the connected base coordinate system by taking a junction of the fruit and the fruit stem as the origin, and taking a line between the junction of the fruit and the fruit stem and a center point of the fruit as a center line, the center line being the Z axis of the connected base coordinate system, which being marked as the Z connected-axis, taking a direction from the central point pointing to the joining point as the positive direction of the Z connected-axis, establishing the X axis and Y axis of the connected base coordinate system on a plane perpendicular to the Z axis of the connected base coordinate system, and marking them as X connected-axis and Y connected-axis respectively; marking the origin of the connected base coordinate system as $O_1$, marking the end point of the unit vector in the positive direction of the X connected-axis as $X_1$, marking the end point of the unit vector in the positive direction of the $Y_1$ connected-axis as $Y_1$, and marking the end point of the unit vector in the positive direction of the Z connected-axis as $Z1$.

As a further improved technical solution for the present invention, the absolute coordinates are spatial coordinates in the public reference base coordinate system, and the unit vectors of the coordinate axis of the public reference base coordinate system are:

$$X=(1\ 0\ 0)^T,\ X=(1\ 0\ 0)^T,\ Z=(0\ 0\ 1)^T.$$

As a further improved technical solution for the present invention, the step (4) includes:

(A) under static conditions, using two high-speed cameras to statically photograph the three feature points on the surface of the fruit and the points $O_1$, $X_1$, $Y_1$, $Z_1$ of the connected base coordinate system established at the junction of the fruit and the fruit stem, using Phantom software to store the photographed images, and using TEMA software to process the feature points $C_1$, $C_2$, $C_3$ and the connected base coordinate system points $O_1$, $X_1$, $Y_1$, $Z_1$ in the images, acquiring the absolute coordinate of the feature points $C_1$, $C_2$, $C_3$ and the absolute coordinate of the connected base coordinate system points $O_1$, $X_1$, $Y_1$, $Z_1$;

(b) creating vectors $\overrightarrow{C_1C_2}$ and $\overrightarrow{C_1C_3}$ via absolute coordinate, unitizing $\overrightarrow{C_1C_2}$ and $\overrightarrow{C_1C_3}$, creating vector $\overrightarrow{C_1O_1}$, vector $\overrightarrow{C_1X_1}$, vector $\overrightarrow{C_1Y_1}$ and vector $\overrightarrow{C_1Z_1}$;

(c) doing a vector product of unitized $\overrightarrow{C_1C_2}$ and $\overrightarrow{C_1C_3}$ to get: $\vec{Y}=\overrightarrow{C_1C_2}\times\overrightarrow{C_1C_3}$, doing a vector product of $\vec{X}=\overrightarrow{C_1C_2}$ and $\vec{Y}$ to get: $\vec{Z}=\vec{X}\times\vec{Y}$, thus, establishing a coordinate system $C_{xyz}$ by taking feature point $C_1$ as an origin, the coordinate axis vector of the coordinate system $C_{xyz}$ is: $\overrightarrow{X_{C_{xyz}}}=(x_{c_x},y_{c_x},z_{c_x})^T, \overrightarrow{Y_{C_{xyz}}}=(x_{c_y},y_{c_y},z_{c_y})^T, \overrightarrow{Z_{C_{xyz}}}=(x_{c_z},y_{c_z},z_{c_z})^T$, calculating angles $\alpha_x$, $\beta_x$, $\gamma_x$ between the vector $\overrightarrow{X_{C_{xyz}}}$ and the X axis, Y axis and Z axis of the public reference base coordinate system through the calculation formula of the space vector angle, calculating angles $\alpha_y$, $\beta_y$, $\gamma_y$ between the vector $\overrightarrow{Y_{C_{xyz}}}$ and the X axis, Y axis and Z axis of the public reference base coordinate system, calculating angles $\alpha_z$, $\beta_z$, $\gamma_z$ between the vector $\overrightarrow{Z_{C_{xyz}}}$ and the X-axis, Y-axis and Z-axis of the public reference base coordinate system, then the coordinate conversion matrix is:

$$A=\begin{pmatrix}\cos\alpha_x & \cos\beta_x & \cos\gamma_x \\ \cos\alpha_y & \cos\beta_y & \cos\gamma_y \\ \cos\alpha_z & \cos\beta_z & \cos\gamma_z\end{pmatrix}; \qquad (1)$$

the coordinates of point $O_1$ under the coordinate system $C_{xyz}$ are obtained by formula (2):

$$O_{1_{C_{xyz}}}=A*\overrightarrow{C_1O_1}=\begin{pmatrix}\cos\alpha_x & \cos\beta_x & \cos\gamma_x \\ \cos\alpha_y & \cos\beta_y & \cos\gamma_z \\ \cos\alpha_z & \cos\beta_z & \cos\gamma_z\end{pmatrix}\begin{pmatrix}x'_{o_1}\\y'_{o_1}\\z'_{o_1}\end{pmatrix}=\begin{pmatrix}x_{O_{1_{C_{xyz}}}}\\y_{O_{1_{C_{xyz}}}}\\z_{O_{1_{C_{xyz}}}}\end{pmatrix}; \qquad (2)$$

wherein, $\overrightarrow{C_1O_1}=(x_{O_1}'\ y_{O_1}'\ z_{O_1}')^T$, and obtained from (b) in step (4);

similarly, $$X_{1_{C_{xyz}}}=A*\overrightarrow{C_1X_1},$$

$$Y_{1_{C_{xyz}}}=A*\overrightarrow{C_1X_1}\text{ and }Z_{1_{C_{xyz}}}=A*\overrightarrow{C_1Z_1}$$

can be obtained, wherein the coordinates of $$X_{1_{C_{xyz}}},Y_{1_{C_{xyz}}},Z_{1_{C_{xyz}}}$$

are the coordinates of points $X_1$, $Y_1$, $Z_1$ under the coordinate system $C_{xyz}$;

the coordinates of $$O_{1_{C_{xyz}}},X_{1_{C_{xyz}}},Y_{1_{C_{xyz}}},Z_{1_{C_{xyz}}}$$

are the coordinates of points $O_1$, $X_1$, $Y_1$, $Z_1$ under the coordinate system $C_{xyz}$, that is, representing the inherent relationship between the feature point and the connected base coordinate system.

As a further improved technical solution for the present invention, the step (5) includes:

(a) using two high-speed cameras to photograph the fruit dynamic motion, using Phantom software to store each frame of image of the photographed video, using TEMA software to process the feature points in the images, and obtaining the absolute coordinate of the feature points on the surface of the fruit;

(b) calculating angles $\alpha_{x_t}$, $\beta_{x_t}$, $\gamma_{x_t}$ between the vector $$\overrightarrow{X_{C_{xyz_t}}}$$

and the X axis, Y axis, and Z axis of the public reference base coordinate system at t moment through the calculation formula of the space vector angle, calculating angles $\alpha_{y_t}$, $\beta_{y_t}$, $\gamma_{y_t}$ between the vector $$\overrightarrow{Y_{C_{xyz_t}}}$$

and me x axis, Y axis and Z axis of the public reference base coordinate system, calculating angles $\alpha_{z_t}$, $\beta_{z_t}$, $\gamma_{z_t}$ between the vector $$\overrightarrow{Z_{C_{xyz_t}}}$$

and the X axis, Y axis and Z axis of the public reference base coordinate system, wherein, $$\overrightarrow{X_{C_{xyz_t}}}, \overrightarrow{Y_{C_{xyz_t}}}, \overrightarrow{Z_{C_{xyz_t}}}$$

are the coordinate axis vector of the coordinate system $C_{xyz}$ established by taking the feature point $C_1$ in one frame of image corresponding to the t moment as an origin, then the coordinate conversion matrix is:

$$A_1 = \begin{pmatrix} \cos\alpha_{x_t} & \cos\beta_{x_t} & \cos\gamma_{x_t} \\ \cos\alpha_{y_t} & \cos\beta_{y_t} & \cos\gamma_{z_t} \\ \cos\alpha_{z_t} & \cos\beta_{z_t} & \cos\gamma_{z_t} \end{pmatrix}; \tag{3}$$

the coordinates of point $O_1$ in the public reference base coordinate system, that is, the absolute coordinate is:

$$\begin{pmatrix} x_{O_1} \\ y_{O_1} \\ z_{O_1} \end{pmatrix} = \begin{pmatrix} x_{C_1} \\ y_{C_1} \\ z_{C_1} \end{pmatrix} + A_i^{-1} * \begin{pmatrix} x_{O_{1_{C_{xyz}}}} \\ y_{O_{1_{C_{xyz}}}} \\ z_{O_{1_{C_{xyz}}}} \end{pmatrix}; \tag{4}$$

wherein ($x_{O_1}$, $y_{O_1}$, $z_{O_1}$) are the absolute coordinate of the point $O_1$ under t moment, ($x_{C_1}$, $y_{C_1}$, $z_{O_1}$) are the absolute coordinate of the point $C_1$ under t moment, $$(x_{O_{1_{C_{xyz}}}}, y_{O_{1_{C_{xyz}}}}, z_{O_{1_{C_{xyz}}}})$$

are the coordinate of point $O_1$ in the coordinate system $C_{xyz}$; similarly, calculating the absolute coordinate of the points $X_1$, $Y_1$, $Z_1$ under t moment;

each frame of image is independent of each other, and corresponds to a moment respectively, and solves the absolute coordinates of the points $O_1$, $X_1$, $Y_1$, $Z_1$ of the connected base coordinate system frame by frame;

calculating the angle θ between the vector $\overrightarrow{O_1Z_1}$ at each moment and the Z axis in the public reference base coordinate system through the space vector angle formula:

$$\theta = \arccos\left( \frac{|x_{z_1}x_z + y_{z_1}y_z + z_{z_1}z_z|}{\sqrt{x_{z_1}^2 + y_{z_1}^2 + z_{z_1}^2} \times \sqrt{x_z^2 + y_z^2 + z_z^2}} \right); \tag{5}$$

wherein $\overrightarrow{O_1Z_1} = (x_{z_1}, y_{z_1}, z_{z_1})^T$, $(x_z, y_z, z_z)^T$ is the unit vector of the Z axis in the public reference base coordinate system, the angle θ between the vector $\overrightarrow{O_1Z_1}$ and the Z axis in the public reference base coordinate system represents a swing posture of the fruit.

As a further improved technical solution for the present invention, the step (6) includes:

(a) using the axis rotation matrix to rotate $\overrightarrow{O_1Z_1}$ at the moment corresponding to a certain frame of image to a position that coincides with the Z axis in the public reference base coordinate system, calculating the angle between the rotated $\overrightarrow{O_1X_1}$ and the X axis in the public reference base coordinate system, the angle represents a twisting posture of the fruit at the moment corresponding to the frame image, detail as follows:

the Z connected-axis direction vector of the frame of image is: $\overrightarrow{z_{\text{连}}} = \overrightarrow{O_1Z_1} = (x_{z_1}, y_{z_1}, z_{z_1})^T$, $|\overrightarrow{O_1Z_1}| = \sqrt{x_{z_1}^2 + y_{z_1}^2 + z_{z_1}^2}$, calculating the angle φ between the Z connected-axis and the Z axis in the public reference base coordinate system:

$$\varphi = \arccos\left( \frac{z_{Z_1}}{|\overrightarrow{O_1Z_1}|} \right); \tag{6}$$

calculating the angle ψ between the projection of the Z connected-axis in the X axis and Y axis of the public reference base coordinate system and the Y axis of the public reference base coordinate system:

$$\psi = \arccos\left( \frac{y_{Z_1}}{\sqrt{y_{Z_1}^2 + x_{Z_1}^2}} \right); \tag{7}$$

calculating the axis rotation matrix:

$$T_1 = \begin{pmatrix} \cos\varphi & 0 & \sin\varphi \\ 0 & 0 & 0 \\ -\sin\varphi & 0 & \cos\varphi \end{pmatrix}; \tag{8}$$

$$T_2 = \begin{pmatrix} \cos\psi & -\sin\psi & 0 \\ \sin\psi & \cos\psi & 0 \\ 0 & 0 & 1 \end{pmatrix}; \tag{9}$$

the absolute coordinate of the rotated point $X_1$ is consistent with the coordinate of the rotated vector $\overrightarrow{O_1X_1}$, and the rotated vector $\overrightarrow{O_1X_1}$ is:

$$\begin{pmatrix} x_{X_1}' \\ y_{X_1}' \\ z_{X_1}' \end{pmatrix} = T_2^{-1} * T_1^{-1} * \begin{pmatrix} x_{X_1} \\ y_{X_1} \\ z_{X_1} \end{pmatrix}; \tag{10}$$

wherein, $(x_{x_1}, y_{x_1}, z_{x_1})^T$ is the vector $\overrightarrow{O_1X_1}$ before the $\overrightarrow{O_1Z_1}$ of the frame of image is rotated;

the torsion angular degree is:

$$\phi = \arccos\left( \frac{|x_{X_1}'x_X + y_{X_1}'y_X + z_{X_1}'z_X|}{\sqrt{x_{X_1}'^2 + y_{X_1}'^2 + z_{X_1}'^2} \times \sqrt{x_X^2 + y_X^2 + z_X^2}} \right); \tag{11}$$

the torsion angular degree is the angle between the rotated vector $\overrightarrow{O_1X_1}$ and the X axis in the public reference base coordinate system, which represents the torsion posture of the fruit at the moment corresponding to the frame image, wherein $(x_x, y_x, z_x)^T$ is the unit vector of the X axis in the public reference base coordinate system;

(b) Similarly, in (a) of step (6), calculating the twisting posture of the fruit at each moment corresponding to each frame image; and As a further improved technical solution for the present invention, the step (7) includes:

(a) setting moments corresponding to two adjacent frames of images to t+1 moment and t moment, based on the point $O_1$ of the connected base coordinate system in adjacent two frames of images, and calculating the displacement of the point $O_1$ along the X axis of the public reference base coordinate system at t+1 moment and t moment respectively:

$$S_x = x_{O_{t+1}} - x_{O_1} \quad (12);$$

wherein $x_{O_{t+1}}$, $x_{O_1}$ are the coordinates x of the point $O_1$ under the public reference base coordinate system at t+1 moment and t moment; similarly, calculating the displacement $S_y$ along the Y axis and the displacement $S_z$ along the Z axis of the point $O_1$ of the public reference base coordinate system at t+1 moment and t moment, and the combined displacement is:

$$S = \sqrt{S_x^2 + S_y^2 + S_z^2} \quad (13);$$

(b) using the average speed of the point $O_1$ moving along the X axis of the public reference base coordinate system from t moment to t+1 moment to express the instantaneous speed $v_{x(t)}$ of the fruit along the X axis at t moment:

$$v_{x(t)} = \frac{S_x}{\Delta t}; \quad (14)$$

wherein $\Delta t$ is the interval time between two frames of images; similarly, the instantaneous speed $v_{y\,(t)}$ of the fruit along the Y axis of the public reference base coordinate system at t moment and the instantaneous speed $v_{z\,(t)}$ of the fruit along the Z axis of the public reference base coordinate system at t moment can be obtained, then the combined speed of the fruit at t moment is:

$$v = \sqrt{v_{x(t)}^2 + v_{y(t)}^2 + v_{z(t)}^2} \quad (15);$$

(c) using the acceleration of the point $O_1$ moving along the X axis of the public reference base coordinate system from t moment to t+1 moment to express the instantaneous acceleration $a_{x(t)}$ of the fruit along the X axis at the t moment:

$$a_{x(t)} = \frac{v_{x(t+1)} - v_{x(t)}}{\Delta t}; \quad (16)$$

wherein $v_{x\,(t+1)}$ is the instantaneous speed of the fruit along the X axis at t+1 moment, and $v_{x(t)}$ is the instantaneous speed of the fruit along the X axis at t moment; similarly, the instantaneous acceleration $a_{y\,(t)}$ of the fruit along the Y axis of the public reference base coordinate system at t moment and the instantaneous acceleration $a_{z\,(t)}$ of the fruit along the Z axis of the public reference base coordinate system at t moment can be obtained; then the combined acceleration of the fruit at t moment is:

$$a = \sqrt{a_{x(t)}^2 + a_{y(t)}^2 + a_{z(t)}^2} \quad (17);$$

(d) using the angle from the Z connected-axis at t moment to the Z connected-axis at t+1 moment to represent the swing angular displacement of the fruit in $\Delta t$:

$$\Delta \theta = \arccos\left( \frac{|x_{Z_{1_{t+1}}} x_{Z_{1_t}} + y_{Z_{1_{t+1}}} y_{Z_{1_t}} + z_{Z_{1_{t+1}}} z_{Z_{1_t}}|}{\sqrt{x_{Z_{1_{t+1}}}^2 + y_{Z_{1_{t+1}}}^2 + z_{Z_{1_{t+1}}}^2} \times \sqrt{x_{Z_{1_t}}^2 + y_{Z_{1_t}}^2 + z_{Z_{1_t}}^2}} \right); \quad (18)$$

wherein $$(x_{Z_{1_t}}, y_{Z_{1_t}}, z_{Z_{1_t}})^T$$

is the direction vector of Z connected-axis at t moment, that is t moment vector $\overrightarrow{O_1 Z_1}$;

$$(x_{Z_{1_{t+1}}}, y_{Z_{1_{t+1}}}, z_{Z_{1_{t+1}}})^T$$

is the direction vector of Z connected-axis at t+1 moment, that is t+1 moment vector $\overrightarrow{O_1 Z_1}$;

(e) using the average swing angular speed from t moment to t+1 moment to express the t swing angular speed $\omega_{\theta_t}$ of the fruit at t moment:

$$\omega_{\theta_t} = \frac{\Delta \theta}{\Delta t}; \quad (19)$$

(f) using the amount of change of the swing angular speed from t moment to t+1 moment to express the swing angular acceleration $a_{\theta_t}$ of the fruit at t moment:

$$a_{\theta_t} = \frac{\omega_{\theta_{t+1}} - \omega_{\theta_t}}{\Delta t}; \quad (20)$$

(g) using the axis rotation matrix to rotate the Z connected-axis at t moment and the Z connected-axis at t+1 moment to the position that coincides with the Z connected-axis in the public reference base coordinate system, using formula (6) to formula (10) in step (a) in step (6) to calculate the rotated vector $\overrightarrow{O_1 X_1}$ at t moment and the rotated vector $\overrightarrow{O_1 X_1}$ at t+1 moment, then the torsion angular degree from t moment to t+1 moment is:

$$\Delta \phi = \arccos\left( \frac{|x_{X_{1_{t+1}}}' x_{X_t} + y_{X_{1_{t+1}}}' y_{X_t} + z_{X_{1_{t+1}}}' z_{X_t}|}{\sqrt{x_{X_{1_{t+1}}}'^2 + y_{X_{1_{t+1}}}'^2 z_{X_{1_{t+1}}}'^2} \times \sqrt{x_{X_t}^2 + y_{X_t}^2 + z_{X_t}^2}} \right); \quad (21)$$

wherein $$(x_{X_{1_t}}', y_{X_{1_t}}', z_{X_{1_t}}')^T$$

is the rotated vector $\overrightarrow{O_1X_1}$ at t moment, $$\left(xx_{1_{t+1}}', yx_{1_{t+1}}', zx_{1_{t+1}}'\right)^T$$

is the rotated vector $\overrightarrow{O_1X_1}$ at t+1 moment;

the torsion angular speed of the fruit at t moment is:

$$\omega_{\phi_t} = \frac{\Delta \phi}{\Delta t}; \quad (22)$$

and the torsion angular acceleration of the fruit at t moment is:

$$a_{\phi_t} = \frac{\omega_{\phi_{t-1}} - \omega_{\phi_t}}{\Delta t}. \quad (23)$$

The beneficial effect of the present invention is: when the inertial force generated by the vibration of vibrating fruit picking exceeds the separation force between the fruit and the fruit stem, the fruit is separated from the fruit branch or the fruit stem at the weakest connection point to complete the picking. The effect of fruit separation ultimately depends on the maximum inertial force generated when the fruit vibrates. Inertial force comes from acceleration, so acceleration response is one of the most important characteristics in fruit tree dynamics. This method can construct the trajectory of the fruit in the vibration process through the relationship between the conjoined base at the junction of the fruit stem and the fruit, and then solve the displacement, speed and acceleration of fruit at each moment, which is beneficial to explore the law of fruit movement. And the present invention can also obtain the swing posture and the torsion posture in the process of fruit vibration. This method is aimed at the study of fruit movement status in the field of fruit vibration harvesting, and can better track the movement of fruits.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENT

The following further describes the specific implementation of the present invention based on FIGS. 1 to 9.

Figure 1:
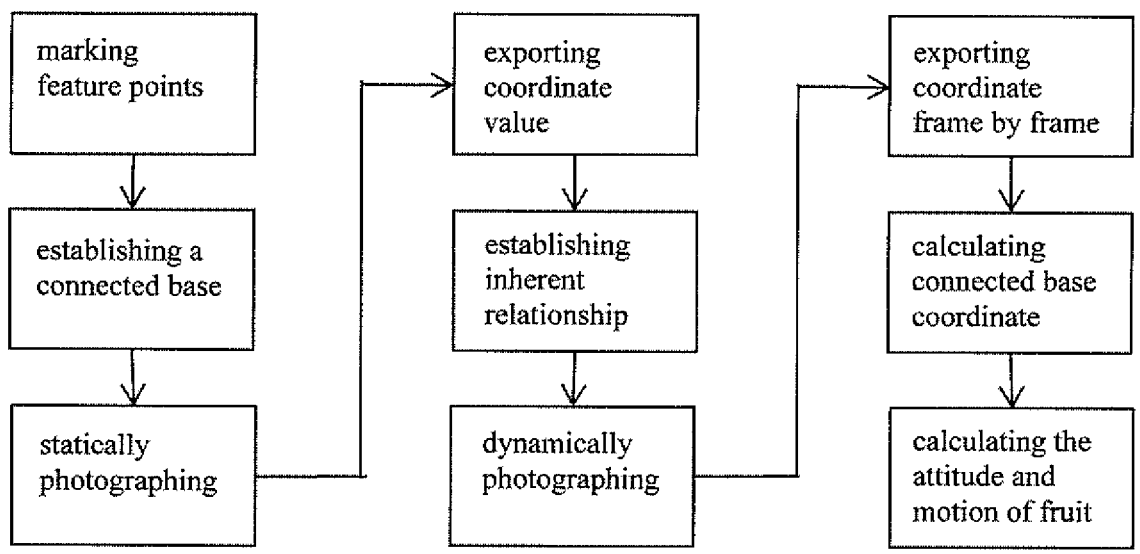
FIG. 1 shows a flowchart of the method.

This embodiment provides a binocular-vision-based method for tracking fruit space attitude and fruit space motion. FIG. 1 is an application step diagram of this embodiment. The content of FIG. 1 will be expanded in detail below.

Mark three feature points $C_1$, $C_2$, $C_3$ on the surface of the fruit.

Establish a method for setting the fruit posture in space. The fruit is regarded as a rigid body, which does not deform in any state, and the fruit is regarded as a standard rotating body. establishing the connected base coordinate system by taking a junction of the fruit and the fruit stem as the origin, and taking a line between the junction of the fruit and the fruit stem and a center point of the fruit as a center line, the center line being the Z axis of the connected base coordinate system, which being marked as the Z connected-axis, taking a direction from the central point pointing to the joining point as the positive direction of the Z connected-axis, establishing the X-axis and Y-axis of the connected base coordinate system on a plane perpendicular to the Z-axis of the connected base coordinate system, and marking them as X connected-axis and Y connected-axis respectively; marking the origin of the connected base coordinate system as $O_1$, marking the end point of the unit vector in the positive direction of the X connected-axis as $X_1$, marking the end point of the unit vector in the positive direction of the Y connected-axis as $Y_1$, and marking the end point of the unit vector in the positive direction of the Z connected-axis as $Z_1$. Using this method, the movement of the fruit in space can be decomposed into translation, swinging around the junction of the fruit stem and the fruit, and twisting around the centerline. Using this method, the movement of the fruit in space can be decomposed into translation, swinging around the junction of the fruit stem and the fruit, and twisting around the centerline. Using this method, the movement of the fruit in space can be decomposed into translation, swinging around the junction of the fruit stem and the fruit, and torsion movement around the centerline.

Establish a public reference base coordinate system, the unit vector of the coordinate axis of the public reference base coordinate system is:

$X = (1\ 0\ 0)^T$, $X = (1\ 0\ 0)^T$, $Z = (0\ 0\ 1)^T$.

The absolute coordinates described in this article are all spatial coordinates in the public reference base coordinate system. The vectors described in this article are all vectors in the public reference base coordinate system.

Figure 2:
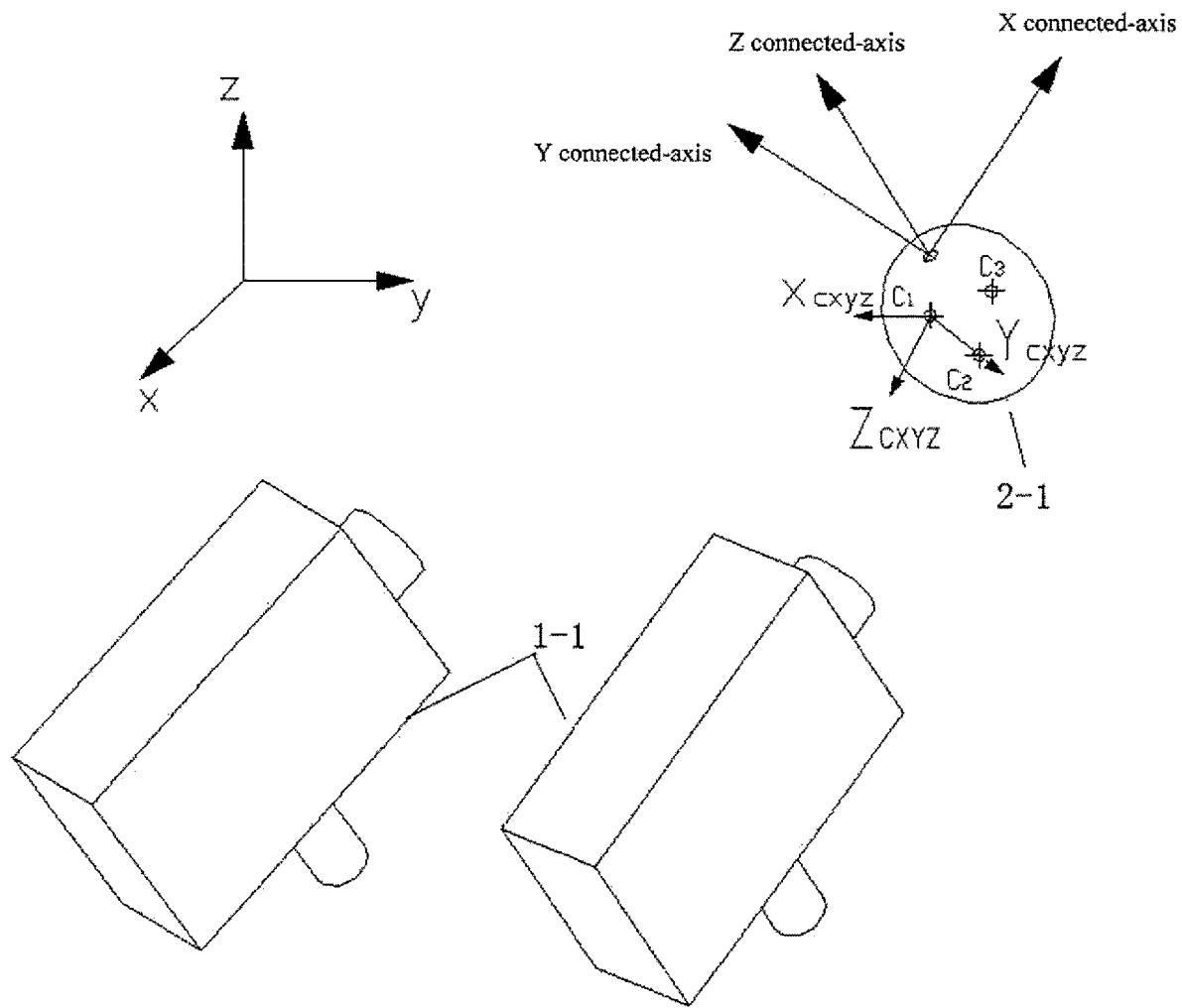
FIG. 2 shows a relationship diagram of a coordinate system in a fruit space.

Since the feature points on the fruit surface tracked by the binocular camera cannot directly reflect the spatial posture of the fruit, this embodiment invented a method for creating a fixed relationship between the conjoined base and the feature points on the fruit surface. First, using two high-speed cameras 1-1 (M310, VEO 410) to statically photograph the three feature points on the surface of the fruit and the points $O_1$, $X_1$, $Y_1$, $Z_1$ of the connected base coordinate system established at the junction of the fruit and the fruit stem, using Phantom software to store the photographed images, and using TEMA software to process the feature points and the connected base coordinate system points $O_1$, $X_1$, $Y_1$, $Z_1$ in the images, export the spatial absolute coordinate of the feature points $C_1$, $C_2$, $C_3$ and the points $O_1$, $X_1$, $Y_1$, $Z_1$ of the connected base coordinate system and then establish an inherent relationship between the feature points and the connected base coordinate system. Referring to FIG. 2, this embodiment uses two high-speed cameras 1-1 to photograph the fruit 2-1. Two high-speed cameras 1-1 can obtain depth information by binocular visual tracking, and obtain the spatial coordinates of the fruit 2-1. Reference numeral 1-1 in FIG. 2 represents a high-speed camera, reference numeral 2-1 represents a fruit, X, Y, and Z in FIG. 2 represent a public reference base coordinate system, and X connected-axis, Y connected-axis, Z connected-axis represent a connected base coordinate system, $X_{cxyz}$, $Y_{cxyz}$, $Z_{cxyz}$ represent coordinate system $C_{xyz}$. Specifically, it includes the following steps:

(a) under static conditions, using two high-speed cameras (M310, VEO 410) to statically photograph the three feature points $C_1$, $C_2$, $C_3$ on the surface of the fruit and the points $O_1$, $X_1$, $Y_1$, $Z_1$ of the connected base coordinate system established at the junction of the fruit and the fruit stem, using Phantom software to store the photographed images, and using TEMA software to process the feature points $C_1$, $C_2$, $C_3$ and the connected base coordinate system points $O_1$, $X_1$, $Y_1$, $Z_1$ in the images, acquiring the absolute coordinate of the feature points $C_1$, $C_2$, $C_3$ and the absolute coordinate of the connected base coordinate system points $O_1$, $X_1$, $Y_1$, $Z_1$; the absolute coordinate of feature point $C_2$ is $(x_{C_2}, y_{C_2}, z_{C_2})^T$, the absolute coordinate of feature point $C_1$ is $(x_{C_1}, y_{C_1}, z_{C_1})^T$, the absolute coordinate of feature point $C_3$ is $(x_{C_3}, y_{C_3}, z_{C_3})^T$;

(b) creating vectors $\overrightarrow{C_1C_2}$ and $\overrightarrow{C_1C_3}$ via absolute coordinate, unitizing $\overrightarrow{C_1C_2}$ and $\overrightarrow{C_1C_3}$, $\overrightarrow{C_1C_2}$ and $\overrightarrow{C_1C_3}$ are: $\overrightarrow{C_1C_2}=(x_{C_2}-x_{C_1}, y_{C_2}-y_{C_1}, z_{C_2}-z_{C_1})^T$, $\overrightarrow{C_1C_3}=(x_{C_3}-x_{C_1}, y_{C_3}-y_{C_1}, z_{C_3}-z_{C_1})^T$; establish vector $\overrightarrow{C_1O_1}$, $\overrightarrow{C_1O_1}=(x_{O_1}-x_{C_1}, y_{O_1}-y_{C_1}, z_{O_1}-z_{C_1})^T=(x_{O_1}', y_{O_1}', z_{O_1}')^T$; $(x_a, y_a, z_a)^T$ is the coordinate of the point $O_1$ of the connected base coordinate system in the public reference base coordinate system; and use the same method to create vector $\overrightarrow{C_1X_1}$, vector $\overrightarrow{C_1Y_1}$ and vector $\overrightarrow{C_1Z_1}$;

(c) doing a vector product of unitized $\overrightarrow{C_1C_2}$ and $\overrightarrow{C_1C_3}$ to get: $\vec{Y}=\overrightarrow{C_1C_2}\times\overrightarrow{C_1C_3}$, doing a vector product of $\vec{X}=\overrightarrow{C_1C_2}$ and $\vec{Y}$ to get: $\vec{Z}=\vec{X}\times\vec{Y}$, thus, establishing a coordinate system $C_{xyz}$ by taking feature point $C_1$ as an origin, the coordinate axis vector of the coordinate system $C_{xyz}$ is: $X_{C_{xyz}}=(x_{C_1}, y_{C_1}, z_{C_1})^T\overline{X_{C_{xyz}}}=(x_{C_2}, y_{C_2}, z_{C_2})^T\overline{Z_{C_{xyz}}}=(x_{C_3}, y_{C_3}, z_{C_3})^T$, calculating angles $\alpha_x$, $\beta_x$, $\gamma_x$ between the vector $\overline{X_{C_{xyz}}}$ and the X axis, Y axis and Z axis of the public reference base coordinate system through the calculation formula of the space vector angle, calculating angles $\alpha_y$, $\beta_y$, $\gamma_y$ between the vector $\overline{Y_{C_{xyz}}}$ and the X axis, Y axis and Z axis of the public reference base coordinate system, calculating angles $\alpha_z$, $\beta_z$, $\gamma_z$ between the vector $\overline{Z_{C_{xyz}}}$ and the X axis, Y axis and Z axis of the public reference base coordinate system; wherein the calculation formula for the angle of the space vector is:

$$\cos\varphi = \frac{|m_1 m_2 + n_1 n_2 + p_1 p_2|}{\sqrt{m_1^2+n_1^2+p_1^2}\times\sqrt{m_2^2+n_2^2+p_2^2}};$$

wherein $m_1$, $m_2$, $n_1$, $n_2$, $p_1$, $p_2$ respectively correspond to the X coordinate, Y coordinate, and Z coordinate of the space vector;

the coordinate conversion matrix is:

$$A = \begin{pmatrix} \cos\alpha_x & \cos\beta_x & \cos\gamma_x \\ \cos\alpha_y & \cos\beta_y & \cos\gamma_z \\ \cos\alpha_z & \cos\beta_z & \cos\gamma_z \end{pmatrix}; \quad (1)$$

the coordinates of point $O_1$ under the coordinate system $C_{xyz}$ are obtained by formula (2):

$$O_{1_{C_{xyz}}} = A*\overrightarrow{C_1O_1} = \begin{pmatrix} \cos\alpha_x & \cos\beta_x & \cos\gamma_x \\ \cos\alpha_y & \cos\beta_y & \cos\gamma_z \\ \cos\alpha_z & \cos\beta_z & \cos\gamma_z \end{pmatrix}\begin{pmatrix} x_{O_1}' \\ y_{O_1}' \\ z_{O_1}' \end{pmatrix} = \begin{pmatrix} x_{O_{1_{C_{xy}}}} \\ y_{O_{1_{C_{xyz}}}} \\ z_{O_{1_{C_{xyz}}}} \end{pmatrix}; \quad (2)$$

wherein, $\overrightarrow{C_1O_1}=(x_{O_1}', y_{O_1}', z_{O_1}')^T$, and obtained from step (b);

similarly, $$X_{1_{C_{xyz}}} = A*\overrightarrow{C_1X_1}, Y_{1_{C_{xyz}}} = A*\overrightarrow{C_1Y_1} \text{ and } Z_{1_{C_{xyz}}} = A*\overrightarrow{C_1Z_1},$$

wherein the coordinates corresponding to $$X_{1_{C_{xyz}}}, Y_{1_{C_{xyz}}}, Z_{1_{C_{xyz}}}$$

are the coordinates of points $X_1$, $Y_1$, $Z_1$ under the coordinate system $C_{xyz}$; the vector $\overrightarrow{C_1X_1}$, the vector $\overrightarrow{C_1Y_1}$, and the vector $\overrightarrow{C_1Z_1}$ are all obtained from the above-mentioned step (b); the coordinates corresponding to $$O_{1_{C_{xyz}}}, X_{1_{C_{xyz}}}, Y_{1_{C_{xyz}}}, Z_{1_{C_{xyz}}}$$

are use coordinates of points $O_1$, $X_1$, $Y_1$, $Z_1$ under the feature point coordinate system $C_{xyz}$, that is, it represents the inherent relationship between the feature point and the connected base coordinate system. The inherent relationship in this embodiment is:

$$S_e = \left(O_{1_{C_{xyz}}}, X_{1_{C_{xyz}}}, Y_{1_{C_{xyz}}}, Z_{1_{C_{xyz}}}\right) = \begin{pmatrix} 8.3580 & 7.3782 & 8.3534 & 8.2740 \\ -12.4324 & -12.3469 & -12.4959 & -13.4267 \\ -2.3046 & -2.3054 & -3.2860 & -2.2420 \end{pmatrix} \circ$$

Figure 3:
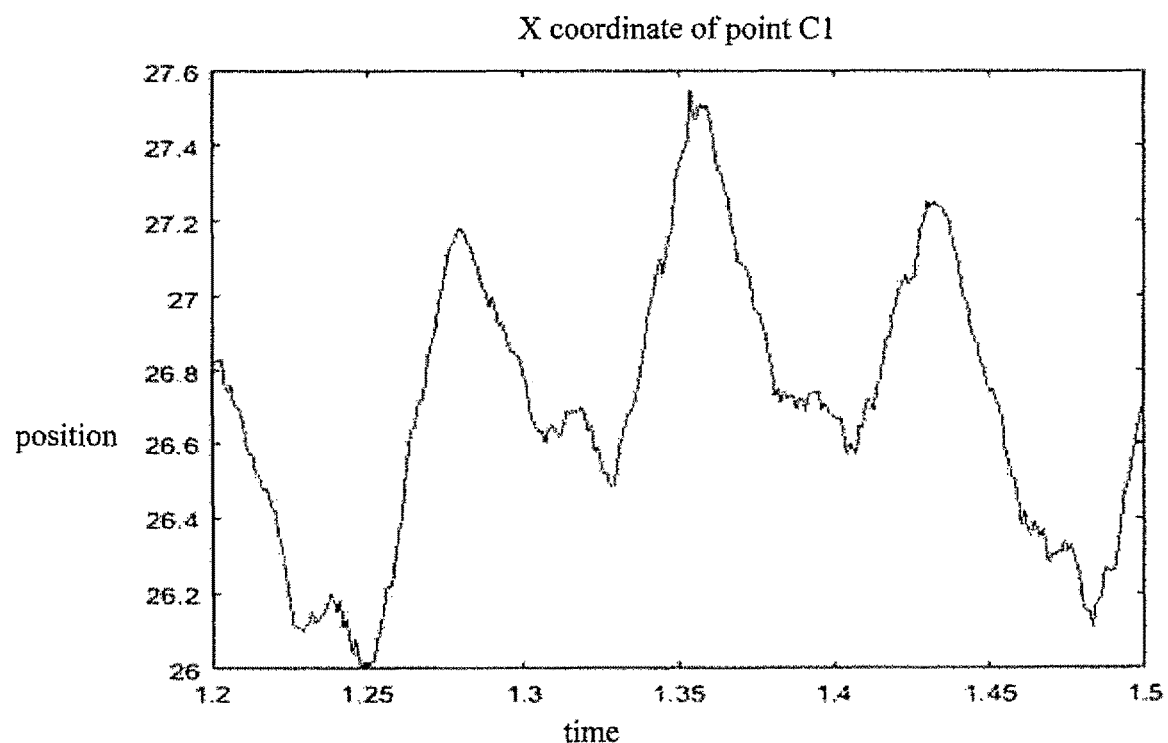
FIG. 3 shows a coordinate curve of a feature point x.
Figure 4:
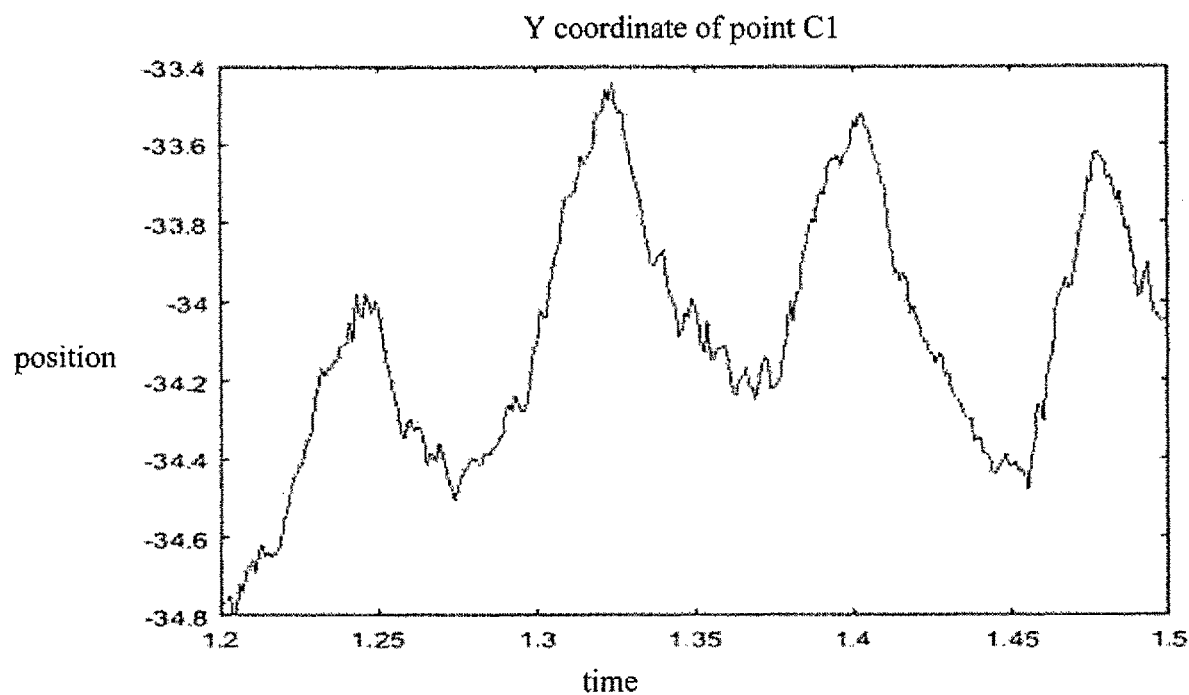
FIG. 4 shows a coordinate curve of a feature point y.
Figure 5:
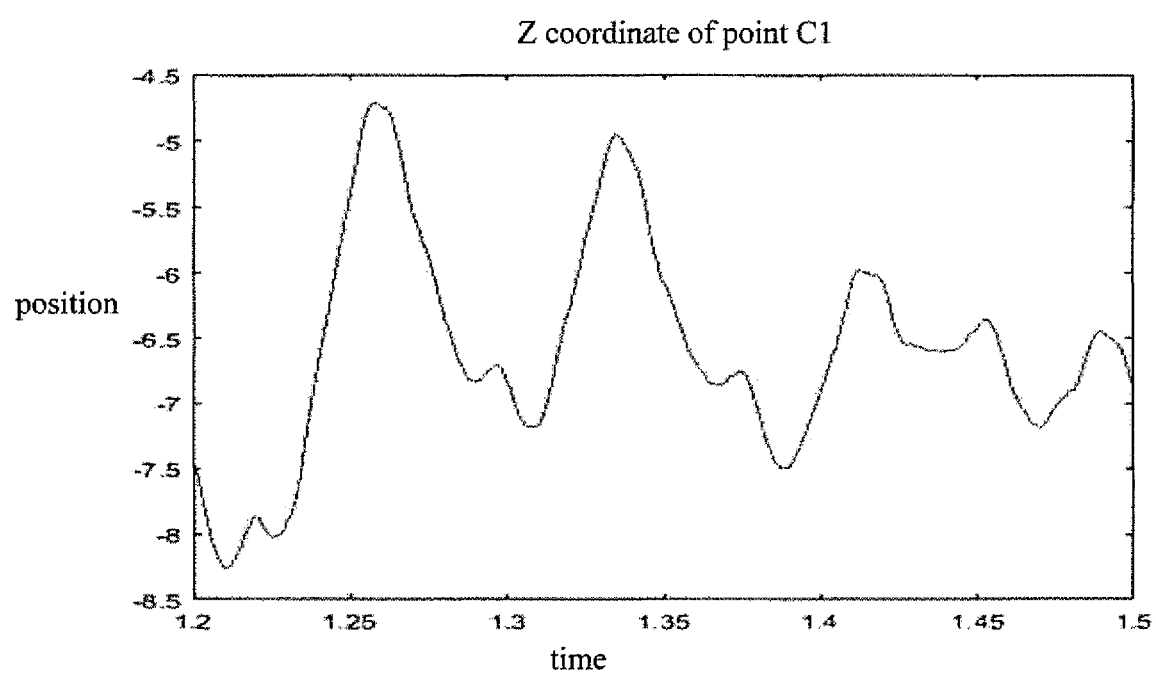
FIG. 5 shows a coordinate curve of a feature point z.
Figure 6:
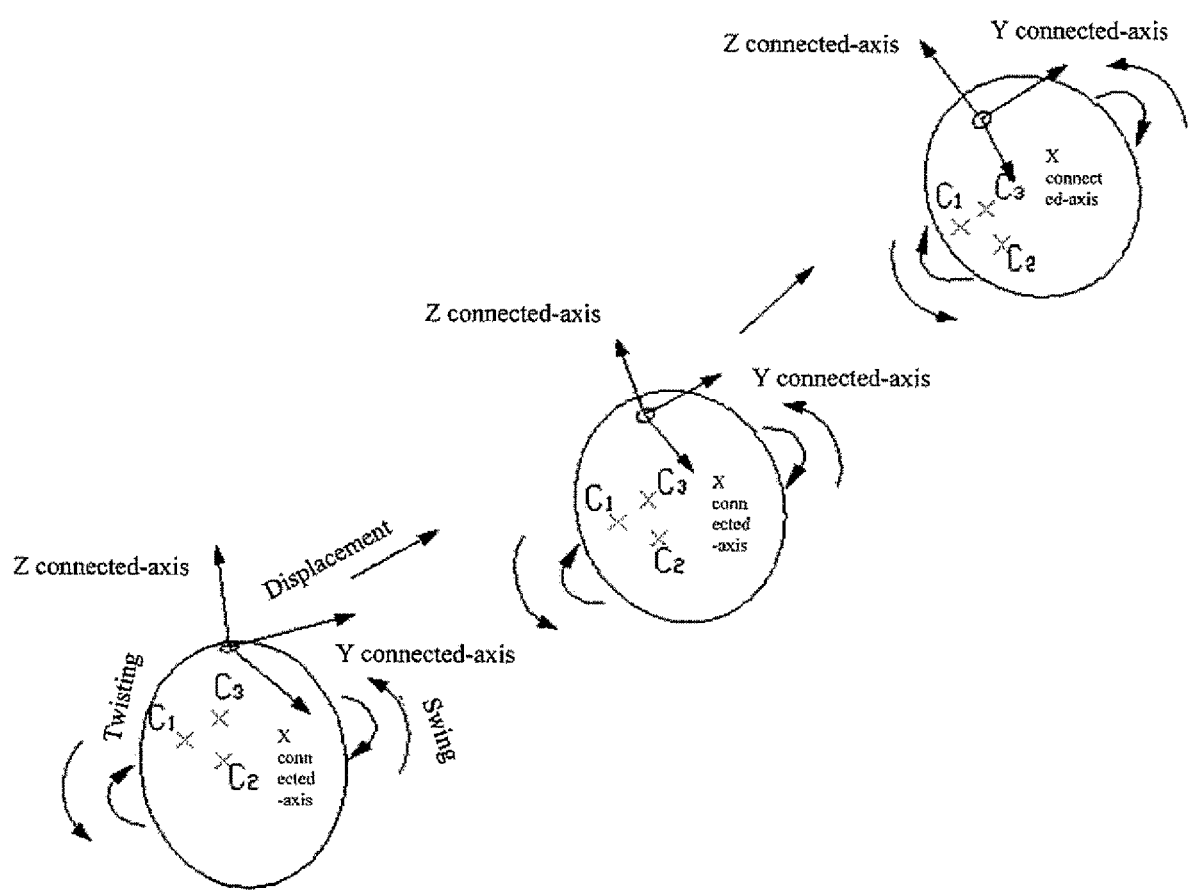
FIG. 6 shows a schematic diagram of a fruit space motion.

The fruit space motion process is divided into translation, swing and torsion, and the motion process is shown in FIG. 6. The binocular-vision-based method of tracking fruit space attitude first uses two high-speed cameras 1-1 (M310, VEO 410) to photograph the fruit dynamic motion, and the movement of the fruit under a certain frequency of excitation. Use Phantom software to store each frame of image in the photographed video, and use TEMA software to process the feature points in each frame of image, export the absolute coordinate of the feature point on the fruit surface of each frame of image in the video, as shown in FIGS. 3 to 5, FIG. 3 is the x-coordinate diagram of the feature point $C_1$, FIG. 4 is the y-coordinate diagram of the feature point $C_1$, and FIG. 5 is the z-coordinate diagram of the feature point $C_1$, which represents the feature point motion curve in the video. The abscissas in FIGS. 3 to 5 represent each moment corresponding to each frame of image. According to the inherent relationship between the feature points and the connected base coordinate system, the absolute coordinate of each frame of image corresponding to the connected base coordinate system points $O_1$, $X_1$, $Y_1$, $Z_1$ at each moment being calculated by the inverse rotation transformation, and calculating an angle between the vector $\overrightarrow{O_1 Z_1}$ at each moment and the Z axis in the public reference base coordinate system through the space vector angle formula, and the angle representing the swing posture of the fruit. Rotate the $\overrightarrow{O_1 Z_1}$ at each moment to a position that coincides with the Z axis in the public reference base coordinate system, and calculating an angle between the rotated $\overrightarrow{O_1 X_1}$ and the X axis in the public reference base coordinate system, the angle representing the twisting posture of the fruit, details as follows:

(a1) Use two high-speed cameras 1-1 to photograph fruit dynamic motion, use Phantom software to store each frame of image of the photographed video, use TEMA software to process the feature point in the image, and export the absolute coordinate of the feature point on the fruit surface frame by frame;

(b1) Follow the above-mentioned steps (b) and (c) to establish a coordinate system $C_{xyz}$ by taking the feature point $C_1$ in one frame of image corresponding to t moment as an origin;

$$\overrightarrow{X_{C_{xyz_t}}}, \overrightarrow{Y_{C_{xyz_t}}}, \overrightarrow{Z_{C_{xyz_t}}}$$

are the coordinate axis vector of the coordinate system $C_{xyz}$ established by taking the feature point $C_1$ in one frame of image corresponding to t moment as an origin;

calculating angles $\alpha_{x_t}$, $\beta_{x_t}$, $\gamma_{x_t}$ between the vector $$\overrightarrow{X_{C_{xyz_t}}}$$

and the X axis, Y axis, and Z axis of the public reference base coordinate system at t moment through the calculation formula of the space vector angle, calculating angles $\alpha_{y_t}$, $\beta_{y_t}$, $\gamma_{y_t}$ between the vector $$\overrightarrow{Y_{C_{xyz_t}}}$$

and the X axis, Y axis and Z axis of the public reference base coordinate system, calculating angles $\alpha_{z_t}$, $\beta_{z_t}$, $\gamma_{z_t}$ between the vector $$\overrightarrow{Z_{C_{xyz_t}}}$$

and the X axis, Y axis and Z axis of the public reference base coordinate system, then the coordinate conversion matrix at t moment is:

$$A_t = \begin{pmatrix} \cos\alpha_{xt} & \cos\beta_{xt} & \cos\gamma_{xt} \\ \cos\alpha_{yt} & \cos\beta_{yt} & \cos\gamma_{yt} \\ \cos\alpha_{zt} & \cos\beta_{zt} & \cos\gamma_{zt} \end{pmatrix}; \quad (3)$$

the coordinates of point $O_1$ in the public reference base coordinate system, that is, the absolute coordinate is:

$$\begin{pmatrix} x_{O_1} \\ y_{O_1} \\ z_{O_1} \end{pmatrix} = \begin{pmatrix} x_{C_1} \\ y_{C_1} \\ z_{C_1} \end{pmatrix} + A_t^{-1} * \begin{pmatrix} x_{O_1 C_{xyz}} \\ y_{O_1 C_{xyz}} \\ z_{O_1 C_{xyz}} \end{pmatrix}; \quad (4)$$

wherein ($x_{O_1}$, $y_{O_1}$, $z_{O_1}$) are the absolute coordinate of the point $O_1$ under t moment, ($x_{C_1}$, $y_{C_1}$, $z_{O_1}$) are the absolute coordinate of the point $C_1$ under t moment, $$\left(x_{O_1 C_{xyz}}, y_{O_1 C_{xyz}}, z_{O_1 C_{xyz}}\right)$$

are the coordinate of point $O_1$ in the coordinate system $C_{xyz}$; similarly, calculating the absolute coordinate of the points $X_1$, $X_1$, $Z_1$ under t moment;

wherein, the vector corresponding to the absolute coordinate of point $X_1$ at t moment is equal to the vector corresponding to the absolute coordinate of point $C_1$ at t moment plus the vector of $A_t^{-1}$ multiplied by the coordinates of point $X_1$ under the coordinate system $C_{xyz}$; the absolute coordinate calculation method of point $Y_1$ and point $Z_1$ can be deduced by analogy;

each frame of image is independent of each other, and corresponds to a moment respectively, and solves the absolute coordinates of the points $O_1$, $X_1$, $Y_1$, $Z_1$ of the connected base coordinate system at each moment frame by frame; calculate the angle θ between the vector $\overrightarrow{O_1 Z_1}$ at each moment and the Z axis in the public reference base coordinate system through the space vector angle formula:

$$\theta = \arccos\left(\frac{|x_{Z_1} x_Z + y_{Z_1} y_Z + z_{Z_1} z_Z|}{\sqrt{x_{Z_1}^2 + y_{Z_1}^2 + z_{Z_1}^2} \times \sqrt{x_Z^2 + y_Z^2 + z_Z^2}}\right); \quad (5)$$

wherein $\overrightarrow{O_1 Z_1} = (x_{z_1}, y_{z_1}, z_{z_1})^T$, $(x_Z, y_Z, z_Z)^T$ is the unit vector of the Z axis in the public reference base coordinate system, the angle θ between the vector $\overrightarrow{O_1 Z_1}$ and the Z axis in the public reference, base coordinate system represents a swing posture of the fruit.

(c1) using the axis rotation matrix to rotate $\overrightarrow{O_1Z_1}$ (that is, Z connected-axis) at the moment corresponding to a certain frame of image to a position that coincides with the Z axis in the public reference base coordinate system, calculating the angle between the rotated $\overrightarrow{O_1X_1}$ and the X axis in the public reference base coordinate system, the angle represents a twisting posture of the fruit at the moment corresponding to the frame image, detail as follows:

the Z connected-axis direction vector of the frame of image is: $\vec{Z_*} = \overrightarrow{O_1Z_1} = (x_{z_1}\ y_{z_1}\ z_{z_1})^T$, $|\overrightarrow{O_1Z_1}| = \sqrt{x_{Z_1}^2 + y_{Z_1}^2 + z_{Z_1}^2}$, calculating the angle $\varphi$ between the Z connected-axis and the Z axis in the public reference base coordinate system:

$$\varphi = \arccos\left(\frac{z_{Z_1}}{|\overrightarrow{O_1Z_1}|}\right); \quad (6)$$

calculating the angle $\psi$ between the projection of $\overrightarrow{O_1Z_1}$ (that is, Z connected-axis) in the X axis and Y axis of the public reference base coordinate system and the Y axis of the public reference base coordinate system:

$$\psi = \arccos\left(\frac{y_{Z_1}}{\sqrt{y_{Z_1}^2 + x_{Z_1}^2}}\right); \quad (7)$$

calculating the axis rotation matrix:

$$T_1 = \begin{pmatrix} \cos\varphi & 0 & \sin\varphi \\ 0 & 1 & 0 \\ -\sin\varphi & 0 & \cos\varphi \end{pmatrix}; \quad (8)$$

$$T_2 = \begin{pmatrix} \cos\psi & -\sin\psi & 0 \\ \sin\psi & \cos\psi & 0 \\ 0 & 0 & 1 \end{pmatrix}; \quad (9)$$

the absolute coordinate of the rotated point $X_1$ is consistent with the coordinate of the rotated vector $\overrightarrow{O_1X_1}$, and the rotated vector $\overrightarrow{O_1X_1}$ is:

$$\begin{pmatrix} x'_{X_1} \\ y'_{X_1} \\ z'_{X_1} \end{pmatrix} = T_2^{-1} * T_1^{-1} * \begin{pmatrix} x_{X_1} \\ y_{X_1} \\ z_{X_1} \end{pmatrix}; \quad (10)$$

wherein, $(x_{x_1}, y_{x_1}, z_{x_1})^T$ is the vector $\overrightarrow{O_1X_1}$ before the $\overrightarrow{O_1Z_1}$ of the frame of image is rotated;

the torsion angular degree is:

$$\phi = \arccos\left(\frac{|x_{X'_1}xx + y_{X'_1}yx + z_{X'_1}zx|}{\sqrt{x_{X'_1}^2 + y_{X'_1}^2 + z_{X'_1}^2} \times \sqrt{x_{X2}^2 + y_{X2}^2 + z_{X2}^2}}\right); \quad (11)$$

the torsion angular degree is the angle between the rotated vector $\overrightarrow{O_1X_1}$ and the X axis in the public reference base coordinate system, which represents the torsion posture of the fruit at the moment corresponding to the frame image, wherein $(x_x, y_x, z_x)^T$ is the unit vector of the X axis in the public reference base coordinate system.

(d1) Similarly, in step (c1), calculating the twisting posture of the fruit at each moment corresponding to each frame image.

Figure 7:
FIG. 7 shows a translation trajectory of a fruit spatial.

A study method of fruit space motion, the space motion of fruit needs to use public reference base coordinates to express its absolute motion. Setting the moments corresponding to two adjacent frames of images to t+1 moment and t moment, based on the point $O_1$ of the connected base coordinate system in adjacent two frames of images, and calculating the displacement of point $O_1$ along the X axis, Y axis and Z axis of the public reference base coordinate system at t+1 moment and t moment respectively. calculating an instantaneous speed along the X axis, an instantaneous speed along the Y axis, and an instantaneous speed along the Z axis of the fruit at t moment according to the displacement, calculating an instantaneous acceleration along the X axis, an instantaneous acceleration along the Y axis and an instantaneous acceleration along the Z axis of the fruit at t moment according to the instantaneous speed, calculating a swing angular displacement of the fruit in the time interval between two adjacent frames of images, sequentially calculating a swing angular speed of the fruit at t moment and a swing angular acceleration of the fruit at t moment via the swing angular displacement, and calculating the torsion angular speed of the fruit at t moment and the torsion angular acceleration of the fruit at t moment according to the torsion angular degree from t moment to t+1 moment. The fruit space motion process is divided into translation, swing and torsion, and the motion process is shown in FIG. 6. The movement of the point $O_1$ along the X Y Z axis represents the translation of the fruit, the swing around the junction of the fruit stem and the fruit represents the swing of the fruit, and the twisting movement around the centerline (that is, Z connected-axis) represents the twist of the fruit. FIG. 7 shows the spatial translation trajectory of fruit, and the curve in FIG. 7 shows the movement of the point $O_1$ in the space coordinates of the public reference base coordinate system.

Wherein, the instantaneous speed moving along the X Y Z axis, the instantaneous acceleration moving along the X Y Z axis, the swing angular displacement, the swing angular speed, and the swing angular acceleration within the frame time interval, the torsion angular degree, the torsion angular speed, and the torsion angular acceleration within the frame time interval all indicate the tracked fruit space motion status. The specific calculation method is as follows:

(a2) setting moments corresponding to two adjacent frames of images to t+1 moment and t moment, based on the point $O_1$ of the connected base coordinate system in adjacent two frames of images, and calculating the displacement of the point $O_1$ along the X axis of the public reference base coordinate system at t+1 moment and t moment respectively:

$$S_x = x_{O_{t+1}} - x_{O_1} \quad (12);$$

wherein $x_{O_{t+1}}$, $x_{O_1}$ are the coordinates x of the point $O_1$ under the public reference base coordinate system at t+1 moment and t moment; similarly, calculating the displacement $S_y$ along the Y axis and the displacement $S_z$ along the Z axis of the point $O_1$ of the public reference base coordinate system at t+1 moment and t moment, and the combined displacement is:

$$S=\sqrt{S_x^2+S_y^2+S_z^2} \qquad (13)$$

(b2) using the average speed of the point $O_1$ moving along the X axis of the public reference base coordinate system from t moment to t+1 moment to express the instantaneous speed $v_{x(t)}$ of the fruit along the X axis at t moment:

$$v_{x(t)} = \frac{S_x}{\Delta t}; \qquad (14)$$

wherein $\Delta t$ is the interval time between two frames of images; similarly, the instantaneous speed $v_{y\ (t)}$ of the fruit along the Y axis of the public reference base coordinate system at t moment and the instantaneous speed $v_{z\ (t)}$ of the fruit along the Z axis at t moment can be obtained, then the combined speed of the fruit at t moment is:

$$v=\sqrt{v_{x(t)}^2+v_{y(t)}^2+v_{z(t)}^2} \qquad (15);$$

(c2) using the acceleration of the point $O_1$ moving along the X axis of the public reference base coordinate system from t moment to t+1 moment to express the instantaneous acceleration $a_{x(t)}$ of the fruit along the X axis at the t moment:

$$a_{x(t)} = \frac{v_{x(t+1)} - v_{x(t)}}{\Delta t}; \qquad (16)$$

wherein $v_{x\ (t+1)}$ is the instantaneous speed of the fruit along the X axis at t+1 moment, and $v_{x(t)}$ is the instantaneous speed of the fruit along the X axis at t moment; similarly, the instantaneous acceleration $a_{y\ (t)}$ of the fruit along the Y axis of the public reference base coordinate system at t moment and the instantaneous acceleration $a_{z\ (t)}$ of the fruit along the Z axis of the public reference base coordinate system at t moment can be obtained; then the combined acceleration of the fruit at t moment is:

$$a=\sqrt{a_{x(t)}^2+a_{y(t)}^2+a_{z(t)}^2} \qquad (17);$$

Figure 8:
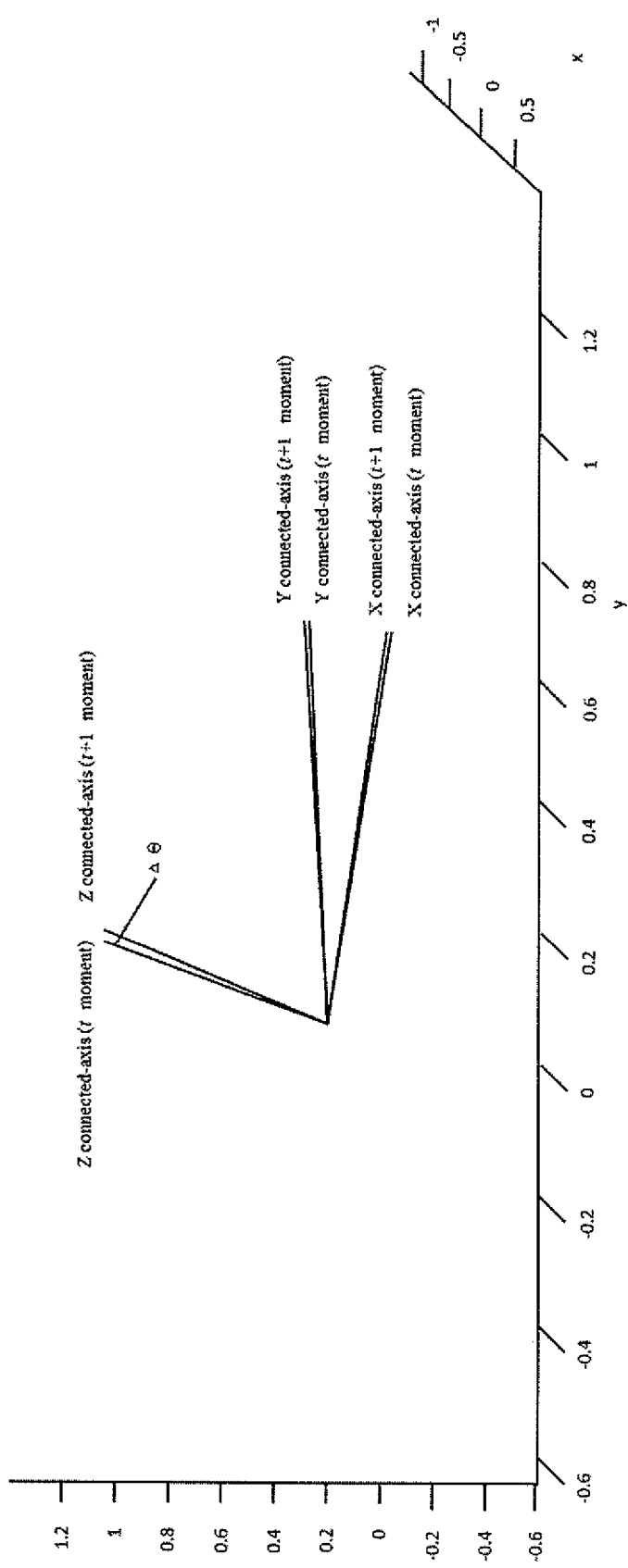
FIG. 8 shows a position diagram of a conjoined base coordinate of two adjacent moments.

(d2) since there are too many solving moments, this embodiment lists the positions of the connected base coordinate system of adjacent t+1 moment and t moment corresponding to two adjacent frames of images to indicate the swing and twist of the fruit. For convenience of representation, the origins of the conjoined base coordinates of two adjacent moments are overlapped, as shown in FIG. 8, the angle $\Delta\theta$ in FIG. 8 is the angle from t moment Z connected-axis to t+1 moment Z connected-axis, and $\Delta\theta$ represents the swing angular displacement of the fruit in $\Delta t$:

$$\Delta\theta = \arccos\left(\frac{|x_{Z_{1_{t+1}}}x_{Z_{1_t}} + y_{Z_{1_{t+1}}}y_{Z_{1_t}} + z_{Z_{1_{t+1}}}z_{Z_{1_t}}|}{\sqrt{x_{Z_{1_{t+1}}}^2 + y_{Z_{t+1}}^2 + z_{Z_{1_{t+1}}}^2} \times \sqrt{x_{Z_{1_t}}^2 + y_{Z_{1_t}}^2 + z_{Z_{1_t}}^2}}\right); \qquad (18)$$

wherein $$(x_{Z_{1_t}},\ y_{Z_{1_t}},\ z_{Z_{1_t}})^T$$

is the direction vector of Z connected-axis at t moment, that is t moment vector $\overrightarrow{O_1Z_1}$;

$$(x_{Z_{1_{t+1}}},\ y_{Z_{1_{t+1}}},\ z_{Z_{1_{t+1}}})^T$$

is the direction vector of Z connected-axis at t+1 moment, that is t+1 moment vector $\overrightarrow{O_1Z_1}$;

(e2) using the average swing angular speed from t moment to t+1 moment to express the t swing angular speed $\omega_{\theta_t}$ of the fruit at t moment:

$$\omega_{\theta_t} = \frac{\Delta\theta}{\Delta t}; \qquad (19)$$

(f2) using the amount of change of the swing angular speed from t moment to t+1 moment to express the swing angular acceleration $a_{\theta_t}$ of the fruit at t moment:

$$a_{\theta_t} = \frac{\omega_{\theta_{t+1}} - \omega_{\theta_t}}{\Delta t}; \qquad (20)$$

Figure 9:
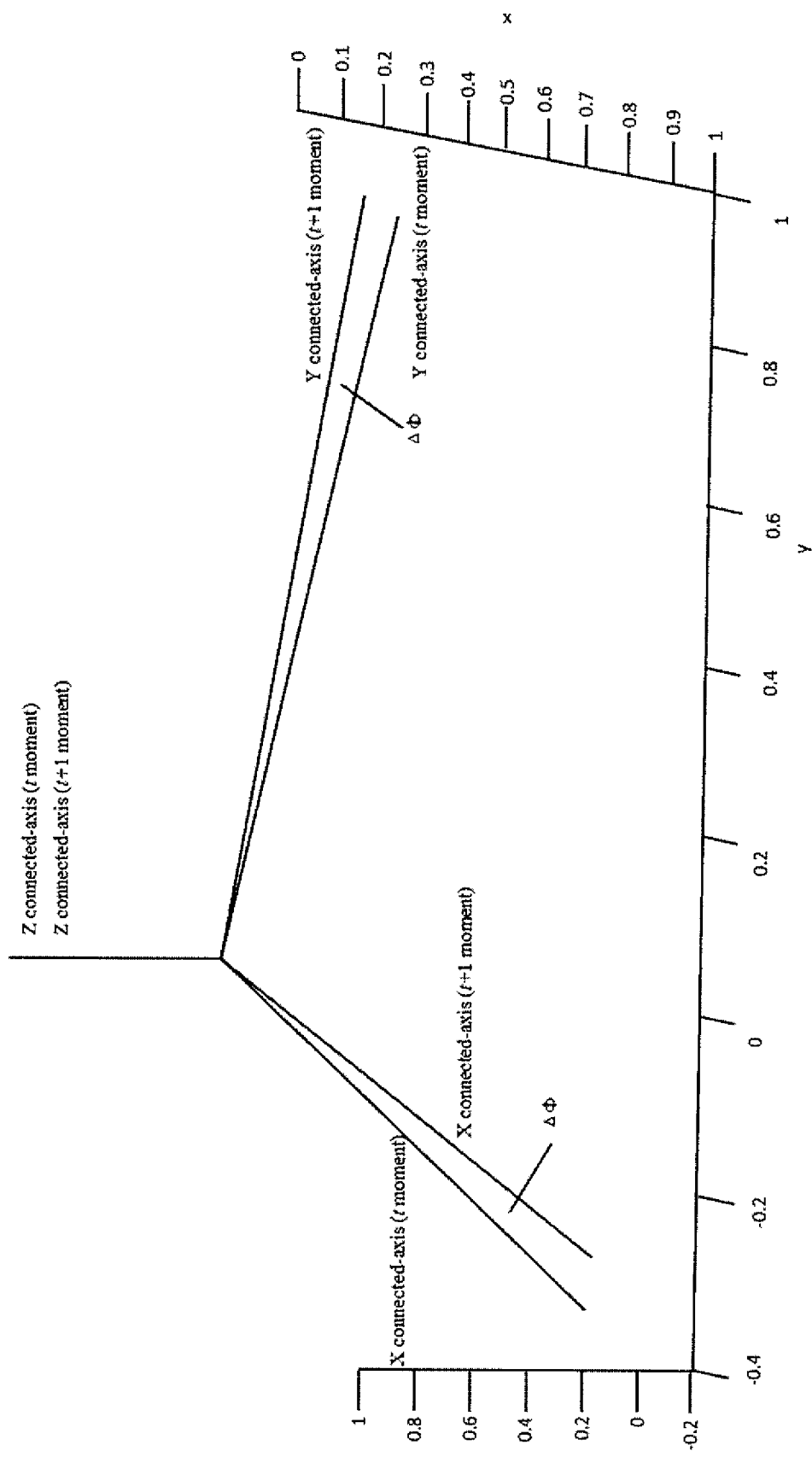
FIG. 9 shows a schematic diagram of torsion angular.

(g2) FIG. 8 is a schematic diagram of the overlapping conjoined base coordinate origins of two adjacent moments. The angle $\Delta\theta$ between the Z connected-axis of t moment and t+1 moment in FIG. 8 represents the swing angular displacement of the fruit in $\Delta t$. However, the angle between the X connected-axis of t moment and t+1 moment, and the angle between the Y connected-axis of t moment and t+1 moment in FIG. 8 are not the torsion angular. Therefore, it is necessary to rotate the Z connected-axis of t moment (also expressed as $\overrightarrow{O_1Z_1}$) and the Z connected-axis of t+1 moment to the position that coincides with the Z connected-axis in the public reference base coordinate system through the axis rotation matrix. As shown in FIG. 9, the two Z connected-axes in this FIG. 9 coincide with the Z axis in the public reference base coordinate system. The angle between the two X connected-axis at this time is the torsion angular degree from t moment to t+1 moment, and the calculation method is: use the formula (6) to formula (10) in the above-mentioned step (c1) respectively calculate the rotated vector $\overrightarrow{O_1X_1}$ at t moment and the rotated vector $\overrightarrow{O_1X_1}$ at t+1 moment.

similarly, in formula (10) of step (c1), the vector $\overrightarrow{O_1X_1}$ rotated at t moment is:

$$\begin{pmatrix} x'_{X_{1_t}} \\ y'_{X_{1_t}} \\ z'_{X_{1_t}} \end{pmatrix} = T_{2_t}^{-1} * T_{1_t}^{-1} * \begin{pmatrix} x_{X_{1_t}} \\ y_{X_{1_t}} \\ z_{X_{1_t}} \end{pmatrix}; \qquad (21)$$

wherein $$(x_{X_{1_t}},\ y_{X_{1_t}},\ z_{X_{1_t}})^T$$

is the vector $\overrightarrow{O_1X_1}$ before the Z connected-axis rotation at t moment;

$$(x'_{X_{1_t}},\ y'_{X_{1_t}},\ z'_{X_{1_t}})^T$$

is the vector $\overrightarrow{O_1X_1}$ after the Z connected-axis rotation at t moment; $T_{2_t}^{-1}$ and $T_{1_t}^{-1}$ are the axis rotation matrices under t moment;

the torsion angular speed degree of the fruit from t moment to t+1 moment is:

$$\Delta\phi = \arccos\left(\frac{|x_{X'_{1_{t+1}}}x_{X_t} + y_{X'_{1_{t+1}}}y_{X_t} + z_{X'_{1_{t+1}}}z_{X_t}|}{\sqrt{x_{X'_{1_{t+1}}}^2 + y_{X'_{1_{t+1}}}^2 + z_{X'_{1_{t+1}}}^2} \times \sqrt{x_{X_t}^2 + y_{X_t}^2 + z_{X_t}^2}}\right); \quad (22)$$

wherein $$(x'_{X_{1_t}},\ y'_{X_{1_t}},\ z'_{X_{1_t}})^T$$

is the rotated vector $\overrightarrow{O_1X_1}$ at t moment, $$(x'_{X_{1_{t+1}}},\ y'_{X_{1_{t+1}}},\ z'_{X_{1_{t+1}}})^T$$

is the rotated vector $\overrightarrow{O_1X_1}$ at t+1 moment;

the torsion angular speed of the fruit at t moment is:

$$\omega_{\phi_t} = \frac{\Delta\phi}{\Delta t}; \quad (23)$$

the torsion angular acceleration of the fruit at t moment is:

$$a_{\phi_t} = \frac{\omega_{\phi_{t+1}} - \omega_{\phi_t}}{\Delta t}. \quad (24)$$

When the inertial force generated by the vibration of vibrating fruit picking exceeds the separation force between the fruit and the fruit stem, the fruit is separated from the fruit branch or the fruit stem at the weakest connection point to complete the picking. The effect of fruit separation ultimately depends on the maximum inertial force generated when the fruit vibrates. Inertial force comes from acceleration, so acceleration response is one of the most important characteristics in fruit tree dynamics. This method can construct the trajectory of the fruit in the vibration process through the relationship between the conjoined base at the junction of the fruit stem and the fruit, and then solve the displacement, speed and acceleration of fruit at each moment, which is beneficial to explore the law of fruit movement. The binocular-vision-based method for tracking fruit space attitude and fruit space motion, the system and analysis software for taking fruit vibration photography belong to the prior art, such as binocular cameras and spatial position synthesis software.

The scope of protection of the present invention includes, but is not limited to, the above-mentioned embodiments. The scope of protection of the present invention is subject to the claims. Any substitutions, modifications, and improvements that can be easily conceived by those skilled in the art made to the present invention fall within the scope of protection of the present invention.

What is claimed is as new and desired to be protected by Letters Patent, is:

1. A computer implemented method for tracking fruit space attitude and fruit space motion, wherein the computer is configured to carry out the steps comprising:
   (1) marking three feature points $C_1, C_2, C_3$ on a surface of a fruit;
   (2) establishing a connected base coordinate system by taking a junction of the fruit and a fruit stem as an origin, a X axis, a Y axis, and a Z axis of the connected base coordinate system are marked as a X connected-axis, a Y connected-axis and a Z connected-axis, respectively, and the origin of the connected base coordinate system is marked as $O_1$, an end point of the unit vector in a positive direction of the X connected-axis is marked as $X_1$, an end point of the unit vector in a positive direction of the Y connected-axis is marked as $Y_1$, an end point of the unit vector in a positive direction of the Z connected-axis is marked as $Z_1$;
   (3) establishing a public reference base coordinate system;
   (4) statically photographing the three feature points on the surface of the fruit and connected base coordinate system points c established at the junction of the fruit and the fruit stem, using software to store the photographed images, and using software to process the feature points and connected base coordinate system points $O_1$, $X_1$, $Y_1$, $Z_1$ in the images, acquiring a absolute coordinate of the feature points $C_1$, $C_2$, $C_3$ and the connected base coordinate system points $O_1$, $X_1$, $Y_1$, $Z_1$, and then acquiring an inherit relationship between the feature points and the connected base coordinate system;
   (5) photographing the fruit dynamic motion, using software to store each frame of the image in the photographed video, using software to process the feature points in the images to acquiring the absolute coordinate of the feature points on the fruit surface, according to an inherent relationship between the feature points and the connected base coordinate system, the absolute coordinate of each frame of image corresponding to the connected base coordinate system points $O_1$, $X_1$, $Y_1$, $Z_1$ at each moment being calculated by inverse rotation transformation, and calculating an angle between the vector $\overrightarrow{O_1Z_1}$ at each moment and the Z axis in the public reference base coordinate system through the space vector angle formula, and the angle representing a swing posture of the fruit;
   (6) rotating the $\overrightarrow{O_1Z_1}$ at each moment to a position that coincides with the Z axis in the public reference base coordinate system, and calculating an angle between the rotated $\overrightarrow{O_1Z_1}$ and the X axis in the public reference base coordinate system, the angle representing a twisting posture of the fruit; and
   (7) setting moments corresponding to two adjacent frames to t+1 moment and t moment, and calculating a displacement of the point $O_1$ along the X axis, Y axis and Z axis of the public reference base coordinate system at t+1 moment and t moment respectively, calculating an instantaneous speed along the X axis, an instantaneous speed along the Y axis, and an instantaneous speed along the Z axis of the fruit at t moment according to the displacement, calculating an instantaneous acceleration along the X axis, an instantaneous acceleration along the Y axis and an instantaneous acceleration along the Z axis of the fruit at t moment according to the instantaneous speed, calculating a swing angular displacement of the fruit in a time interval between the two adjacent frames of images, sequentially calculating a swing angular speed of the fruit at t moment and a swing angular acceleration of the fruit at t moment via the swing angular displacement, and calculating a torsion angular speed of the fruit at t moment and a torsion angular acceleration of the fruit at t moment according to the torsion angular degree from t moment to t+1 moment.

2. The method according to claim 1, wherein the step (2) includes:
establishing the connected base coordinate system by taking a junction of the fruit and the fruit stem as the origin, and taking a line between the junction of the fruit and the fruit stem and a center point of the fruit as a center line, the center line being the Z axis of the connected base coordinate system, which being marked as the Z connected-axis, taking a direction from the central point pointing to the joining point as the positive direction of the Z connected-axis, establishing the X axis and Y axis of the connected base coordinate system on a plane perpendicular to the Z axis of the connected base coordinate system, and marking them as X connected-axis and Y connected-axis respectively; marking the origin of the connected base coordinate system as $O_1$, marking the end point of the unit vector in the positive direction of the X connected-axis as $X_1$, marking the end point of the unit vector in the positive direction of the $Y_1$ connected-axis as $Y_1$, and marking the end point of the unit vector in the positive direction of the Z connected-axis as $Z1$.

3. The method according to claim 2, wherein the absolute coordinates are spatial coordinates in the public reference base coordinate system, and the unit vectors of the coordinate axis of the public reference base coordinate system are:

$X=(1\ 0\ 0)^T$, $Y=(0\ 1\ 0)^T$, $Z=(0\ 0\ 1)^T$.

4. The method according to claim 3, wherein the step (4) includes:
(a) under static conditions, using two high-speed cameras to statically photograph the three feature points on the surface of the fruit and the points $O_1$, $X_1$, $Y_1$, $Z_1$ of the connected base coordinate system established at the junction of the fruit and the fruit stem, using software to store the photographed images, and using software to process the feature points $C_1$, $C_2$, $C_3$ and the connected base coordinate system points $O_1$, $X_1$, $Y_1$, $Z_1$ in the images, acquiring the absolute coordinate of the feature points $C_1$, $C_2$, $C_3$ and the absolute coordinate of the connected base coordinate system points $O_1$, $X_1$, $Y_1$, $Z_1$;

(b) creating vectors $\overrightarrow{C_1C_2}$ and $\overrightarrow{C_1C_3}$ via absolute coordinate, unitizing $\overrightarrow{C_1C_2}$ and $\overrightarrow{C_1C_3}$ creating vector $\overrightarrow{C_1O_1}$, vector $\overrightarrow{C_1X_1}$, vector $\overrightarrow{C_1Y_1}$ and vector $\overrightarrow{C_1Z_1}$;

(c) doing a vector product of unitized $\overrightarrow{C_1C_2}$ and $\overrightarrow{C_1C_3}$ to get: $\vec{Y}=\overrightarrow{C_1C_2}\times\overrightarrow{C_1C_3}$, doing a vector product of $\vec{X}=\overrightarrow{C_1C_2}$ and $\vec{Y}$ to get: $\vec{Z}=\vec{X}\times\vec{Y}$, thus, establishing a coordinate system $C_{xyz}$ by taking feature point $C_1$ as an origin, the coordinate axis vector of the coordinate system $C_{xyz}$ is:

$\overrightarrow{X_{C_{xyz}}}=(x_{C_x}, y_{C_x}, z_{C_x})^T$, $\overrightarrow{Y_{C_{xyz}}}=(x_{C_y}, y_{C_y}, z_{C_y})^T$, $\overrightarrow{Z_{C_{xyz}}}=Z_{C_z}$, $y_{C_z}, z_{C_z})^T$;

calculating angles $\alpha_x$, $\beta_x$, $\gamma_x$ between the vector $\overrightarrow{X_{C_{xyz}}}$ and the X axis, Y axis and Z axis of the public reference base coordinate system through the calculation formula of the space vector angle, calculating angles $\alpha_y$, $\beta_y$, $\gamma_y$ between the vector $$\overrightarrow{Y_{C_{xyz_t}}}$$

and the X axis, Y axis and Z axis of the public reference base coordinate system, calculating angles $\alpha_z$, $\beta_z$, $\gamma_z$ between the vector $$\overrightarrow{Z_{C_{xyz}}}$$

and the X-axis, Y-axis and Z-axis of the public reference base coordinate system, then the coordinate conversion matrix is:

$$A = \begin{pmatrix} \cos\alpha_x & \cos\beta_x & \cos\gamma_x \\ \cos\alpha_y & \cos\beta_y & \cos\gamma_z \\ \cos\alpha_z & \cos\beta_z & \cos\gamma_z \end{pmatrix}; \quad (1)$$

the coordinates of point $O_1$ under the coordinate system $C_{xyz}$ are obtained by formula (2):

$$O_{1_{C_{xyz}}} = A*\overrightarrow{C_1O_1} = \begin{pmatrix} \cos\alpha_x & \cos\beta_x & \cos\gamma_x \\ \cos\alpha_y & \cos\beta_y & \cos\gamma_z \\ \cos\alpha_z & \cos\beta_z & \cos\gamma_z \end{pmatrix}\begin{pmatrix} x'_{O_1} \\ y'_{O_1} \\ z'_{O_1} \end{pmatrix} = \begin{pmatrix} x_{O_{1_{C_{xyz}}}} \\ y_{O_{1_{C_{xyz}}}} \\ z_{O_{1_{C_{xyz}}}} \end{pmatrix}; \quad (2)$$

wherein, $\overrightarrow{C_1O_1}=(x_{O_1}', y_{O_1}', z_{O_1}')^T$, and obtained from (b) in step (4);

similarly, $X_{1_{C_{xyz}}} = A*\overrightarrow{C_1X_1}$、 $Y_{1_{C_{xyz}}} = A*\overrightarrow{C_1Y_1}$ and $Z_{1_{C_{xyz}}} = A*\overrightarrow{C_1Z_1}$ can be obtained, wherein the coordinates of $X_{1_{C_{xyz}}}$、 $Y_{1_{C_{xyz}}}$、 $Z_{1_{C_{xyz}}}$ are the coordinates of points $X_1$, $Y_1$, $Z_1$ under the coordinate system $C_{xyz}$;

the coordinates of $$O_{1_{C_{xyz}}},\ X_{1_{C_{xyz}}},\ Y_{1_{C_{xyz}}},\ Z_{1_{C_{xyz}}} \quad (5)$$

are the coordinates of points $O_1$, $X_1$, $Y_1$, $Z_1$ under the coordinate system $C_{xyz}$, that is, representing the inherent relationship between the feature point and the connected base coordinate system.

5. The method according to claim 4, wherein the step (5) includes:

(a) using two high-speed cameras to photograph the fruit dynamic motion, using software to store each frame of image of the photographed video, using software to process the feature points in the images, and obtaining the absolute coordinate of the feature points on the surface of the fruit;

(b) calculating angles $\alpha_{x_1}$, $\beta_{x_1}$, $\gamma_{x_1}$ between the vector $$\overrightarrow{X_{C_{xyz_t}}}$$

and the X axis, Y axis, and Z axis of the public reference base coordinate system at t moment through the calculation formula of the space vector angle, calculating angles $\alpha_{y_1}$, $\beta_{y_1}$, $\gamma_{y_1}$ between the vector $$\overrightarrow{Y_{C_{xyz_t}}}$$

and the X axis, Y axis and Z axis of the public reference base coordinate system, calculating angles $\alpha_{z_1}$, $\beta_{z_1}$, $\gamma_{z_1}$ between the vector $$\overrightarrow{Z_{C_{xyz_t}}}$$

and the X axis, Y axis and Z axis of the public reference base coordinate system, wherein, $$\overrightarrow{X_{C_{xyz_t}}},\ \overrightarrow{Y_{C_{xyz_t}}},\ \overrightarrow{Z_{C_{xyz_t}}}$$

are the coordinate axis vector of the coordinate system $C_{xyz}$ established by taking the feature point $C_1$ in one frame of image corresponding to the t moment as an origin, then the coordinate conversion matrix is:

$$A_t = \begin{pmatrix} \cos\alpha_{xt} & \cos\beta_{xt} & \cos\gamma_{xt} \\ \cos\alpha_{yt} & \cos\beta_{yt} & \cos\gamma_{zt} \\ \cos\alpha_{zt} & \cos\beta_{zt} & \cos\gamma_{zt} \end{pmatrix}; \quad (3)$$

the coordinates of point $O_1$ in the public reference base coordinate system, that is, the absolute coordinate is:

$$\begin{pmatrix} x_{O_1} \\ y_{O_1} \\ z_{O_1} \end{pmatrix} = \begin{pmatrix} x_{C_1} \\ y_{C_1} \\ z_{C_1} \end{pmatrix} + A_t^{-1} \begin{pmatrix} x_{O_{1C_{xyz}}} \\ y_{O_{1C_{xyz}}} \\ z_{O_{1C_{xyz}}} \end{pmatrix}; \quad (4)$$

wherein $(x_{O_1}, y_{O_1}, z_{O_1})$ are the absolute coordinate of the point $O_1$ under t moment, $(x_{C_1}, y_{C_1}, z_{C_1})$ are the absolute coordinate of the point $C_1$ under t moment, $$(x_{O_{1C_{xyz}}},\ y_{O_{1C_{xyz}}},\ z_{O_{1C_{xyz}}})$$

are the coordinate of point $O_1$ in the coordinate system $C_{xyz}$; similarly, calculating the absolute coordinate of the points $X_1$, $Y_1$, $Z_1$ under t moment;

each frame of image is independent of each other, and corresponds to a moment respectively, and solves the absolute coordinates of the points $O_1$, $X_1$, $Y_1$, $Z_1$ of the connected base coordinate system frame by frame;

calculating the angle $\theta$ between the vector $\overrightarrow{O_1Z_1}$ at each moment and the Z axis in the public reference base coordinate system through the space vector angle formula $$\theta = \arccos\left(\frac{|x_{Z_1}x_Z + y_{Z_1}y_Z + z_{Z_1}z_Z|}{\sqrt{x_{Z_1}^2 + y_{Z_1}^2 + z_{Z_1}^2} \times \sqrt{x_Z^2 + y_Z^2 + z_Z^2}}\right); \quad (5)$$

wherein $\overrightarrow{O_1Z_1} = (x_{z_1}, y_{z_1}, z_{z_1})^T$ $(x_Z, y_Z, z_Z)^T$ is the unit vector of the Z axis in the public reference base coordinate system, the angle $\theta$ between the vector $\overrightarrow{O_1Z_1}$ and the Z axis in the public reference base coordinate system represents a swing posture of the fruit.

6. The method according to claim 5, wherein the step (6) includes:

(a) using the axis rotation matrix to rotate $\overrightarrow{O_1Z_1}$ at the moment corresponding to a certain frame of image to a position that coincides with the Z axis in the public reference base coordinate system, calculating the angle between the rotated $\overrightarrow{O_1X_1}$ and the X axis in the public reference base coordinate system, the angle represents an twisting posture of the fruit at the moment corresponding to the frame image, detail as follows:

the Z connected-axis direction vector of the frame of image is:

$$\overrightarrow{Z_{i\!\!\!\!\!\!\!\!\!\!\!\!\!\!\!}} = \overrightarrow{O_1Z_1} = (x_{z_1}\ y_{z_1}\ z_{z_1})^T,\ |\overrightarrow{O_1Z_1}| = \sqrt{x_{Z_1}^2 + y_{Z_1}^2 + z_{Z_1}^2},$$

calculating the angle $\varphi$ between the Z connected-axis and the Z axis in the public reference base coordinate system:

$$\varphi = \arccos\left(\frac{Z_{Z_1}}{|\overrightarrow{O_1Z_1}|}\right); \quad (6)$$

calculating the angle ψ between the projection of the Z connected-axis in the X axis and Y axis of the public reference base coordinate system and the Y axis of the public reference base coordinate system:

$$\psi = \arccos\left(\frac{y_{Z_1}}{\sqrt{y_{Z_1}^2 + x_{Z_1}^2}}\right); \quad (7)$$

calculating the axis rotation matrix:

$$T_1 = \begin{pmatrix} \cos\varphi & 0 & \sin\varphi \\ 0 & 1 & 0 \\ -\sin\varphi & 0 & \cos\varphi \end{pmatrix}; \quad (8)$$

$$T_2 = \begin{pmatrix} \cos\psi & -\sin\psi & 0 \\ \sin\psi & \cos\psi & 0 \\ 0 & 0 & 1 \end{pmatrix}; \quad (9)$$

the absolute coordinate of the rotated point $X_1$ is consistent with the coordinate of the rotated vector $\overrightarrow{O_1X_1}$, and the rotated vector $\overrightarrow{O_1X_1}$ is:

$$\begin{pmatrix} x_{X_1'} \\ y_{X_1'} \\ z_{X_1'} \end{pmatrix} = T_2^{-1} * T_1^{-1} * \begin{pmatrix} x_{X_1} \\ y_{X_1} \\ z_{X_1} \end{pmatrix}; \quad (10)$$

wherein $(x_{X_1}, y_{X_1}, z_{X_1})^T$ is the vector $\overrightarrow{O_1X_1}$ before the $\overrightarrow{O_1Z_1}$ of the frame of image is rotated;
the torsion angular degree is:

$$\phi = \arccos\left(\frac{|x_{X_1'}x_X + y_{X_1'}y_X + z_{X_1'}z_X|}{\sqrt{x_{X_1'}^2 + y_{X_1'}^2 + z_{X_1'}^2} \times \sqrt{x_X^2 + y_X^2 + z_X^2}}\right); \quad (11)$$

the torsion angular degree is the angle between the rotated vector $\overrightarrow{O_1X_1}$ and the X axis in the public reference base coordinate system, which represents a torsion posture of the fruit at the moment corresponding to the frame image, wherein $(x_X, y_X, z_X)^T$ is the unit vector of the X axis in the public reference base coordinate system; and
(b) similarly, in (a) of step (6), calculating the twisting posture of the fruit at each moment corresponding to each frame image.

7. The method according to claim 6, wherein the step (7) includes:
(a) setting moments corresponding to two adjacent frames of images to t+1 moment and t moment, based on the point $O_1$ of the connected base coordinate system in adjacent two frames of images, and calculating the displacement of the point $O_1$ along the X axis of the public reference base coordinate system at t+1 moment and t moment respectively:

$$S_x = x_{O_{t+1}} - x_{O_t} \quad (12);$$

wherein $x_{O_{t+1}}$, $x_{O_t}$ are the coordinates x of the point $O_1$ under the public reference base coordinate system at t+1 moment and t moment; similarly, calculating the displacement $S_y$ along the Y axis and the displacement $S_z$ along the Z axis of the point $O_1$ of the public reference base coordinate system at t+1 moment and t moment, and the combined displacement is:

$$S = \sqrt{S_x^2 + S_y^2 + S_z^2} \quad (13);$$

(b) using the average speed of the point $O_1$ moving along the X axis of the public reference base coordinate system from t moment to t+1 moment to express the instantaneous speed $v_{x(t)}$ of the fruit along the X axis at t moment:

$$v_{x(t)} = \frac{S_x}{\Delta t}; \quad (14)$$

wherein $\Delta t$ is the interval time between two frames of images; similarly, the instantaneous speed $v_{y(t)}$ of the fruit along the Y axis of the public reference base coordinate system at t moment and the instantaneous speed $v_{z(t)}$ of the fruit along the Z axis of the public reference base coordinate system at t moment can be obtained, then the combined speed of the fruit at t moment is:

$$v = \sqrt{v_{x(t)}^2 + v_{y(t)}^2 + v_{z(t)}^2} \quad (15);$$

(c) using the acceleration of the point $O_1$ moving along the X axis of the public reference base coordinate system from t moment to t+1 moment to express the instantaneous acceleration $a_{x(t)}$ of the fruit along the X axis at the t moment:

$$a_{x(t)} = \frac{v_{x(t+1)} - v_{x(t)}}{\Delta t}; \quad (16)$$

wherein $v_{x(t+1)}$ is the instantaneous speed of the fruit along the X axis at t+1 moment, and $v_{x(t)}$ is the instantaneous speed of the fruit along the X axis at t moment;
similarly, the instantaneous acceleration $a_{y(t)}$ of the fruit along the Y axis of the public reference base coordinate system at t moment and the instantaneous acceleration $a_{z(t)}$ of the fruit along the Z axis of the public reference base coordinate system at t moment can be obtained; then the combined acceleration of the fruit at t moment is:

$$a = \sqrt{a_{x(t)}^2 + a_{y(t)}^2 + a_{z(t)}^2} \quad (17);$$

(d) using the angle from the Z connected-axis at t moment to the Z connected-axis at t+1 moment to represent the swing angular displacement of the fruit in $\Delta t$:

$$\Delta\theta = \arccos\left(\frac{|x_{Z_{1_{t+1}}}x_{Z_{1_t}} + y_{Z_{1_{t+1}}}y_{Z_{1_t}} + z_{Z_{1_{t+1}}}z_{Z_{1_t}}|}{\sqrt{x_{Z_{1_{t+1}}}^2 + y_{Z_{1_{t+1}}}^2 + z_{Z_{1_{t+1}}}^2} \times \sqrt{x_{Z_{1_t}}^2 + y_{Z_{1_t}}^2 + z_{Z_{1_t}}^2}}\right); \quad (18)$$

wherein $$(x_{Z_{1_t}}, y_{Z_{1_t}}, z_{Z_{1_t}})^T$$

the direction vector of Z connected-axis at t moment, that is t moment vector $\overrightarrow{O_1Z_1}$;

$$(x_{Z_{1_{t+1}}}, y_{Z_{1_{t+1}}}, z_{Z_{1_{t+1}}})^T$$

is the direction vector of Z connected-axis at t+1 moment, that is t+1 moment vector $\overrightarrow{O_1Z_1}$;

(e) using the average swing angular speed from t moment to t+1 moment to express the t swing angular speed $\omega_{\theta_t}$ of the fruit at t moment:

$$\omega_{\theta_t} = \frac{\Delta\theta}{\Delta t}; \tag{19}$$

(f) using the amount of change of the swing angular speed from t moment to t+1 a moment to express the swing angular acceleration $a_{\theta_t}$ of the fruit at t moment:

$$a_{\theta_t} = \frac{\omega_{\theta_{t+1}} - \omega_{\theta_t}}{\Delta t}; \tag{20}$$

(g) using the axis rotation matrix to rotate the Z connected-axis at t moment and the Z connected-axis at t+1 moment to the position that coincides with the Z connected-axis in the public reference base coordinate system, using formula (6) to formula (10) in step (a) of step (6) to calculate the rotated vector $\overrightarrow{O_1X_1}$ at t moment and the rotated vector $\overrightarrow{O_1X_1}$ at t+1 moment, then the torsion angular degree from t moment to t+1 moment is:

$$\Delta\phi = \arccos\left(\frac{|x_{X'_{1_{t+1}}} x_{X_t} + y_{X'_{1_{t+1}}} y_{X_t} + z_{X'_{1_{t+1}}} z_{X_t}|}{\sqrt{x_{X'_{1_{t+1}}}^2 + y_{X'_{1_{t+1}}}^2 + z_{X'_{1_{t+1}}}^2} \times \sqrt{x_{X_t}^2 + y_{X_t}^2 + z_{X_t}^2}}\right); \tag{21}$$

wherein $$(x'_{X_{1_t}}, y'_{X_{1_t}}, z'_{X_{1_t}})^T$$

is the rotated vector $\overrightarrow{O_1X_1}$ at t moment, $$(x'_{X_{1_{t+1}}}, y'_{X_{1_{t+1}}}, z'_{X_{1_{t+1}}})^T$$

is the rotated vector $\overrightarrow{O_1X_1}$ at t+1 moment;

the torsion angular speed of the fruit at t moment is:

$$\omega_{\phi_t} = \frac{\Delta\phi}{\Delta t}; \tag{22}$$

the torsion angular acceleration of the fruit at t moment is:

$$a_{\phi_t} = \frac{\omega_{\phi_{t+1}} - \omega_{\phi_t}}{\Delta t}. \tag{23}$$

* * * * *